(12) United States Patent
Bhattad et al.

(10) Patent No.: US 10,735,117 B2
(45) Date of Patent: Aug. 4, 2020

(54) TECHNIQUES AND APPARATUSES FOR SIGNAL QUALITY MEASUREMENTS FOR NARROWBAND INTERNET OF THINGS (NB-IOT) DEVICES

(71) Applicant: QUALCOMM Incorporated, San Diego, CA (US)

(72) Inventors: Kapil Bhattad, Bangalore (IN); Alberto Rico Alvarino, San Diego, CA (US); Xiao feng Wang, San Diego, CA (US); Arvind Sridharan, Bangalore (IN); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 92 days.

(21) Appl. No.: 15/714,285

(22) Filed: Sep. 25, 2017

(65) Prior Publication Data
US 2018/0278347 A1 Sep. 27, 2018

(30) Foreign Application Priority Data

Mar. 23, 2017 (IN) .............................. 201741010252

(51) Int. Cl.
*H04L 12/00* (2006.01)
*H04B 17/309* (2015.01)
(Continued)

(52) U.S. Cl.
CPC ............ *H04B 17/309* (2015.01); *H04W 4/70* (2018.02); *H04W 48/12* (2013.01);
(Continued)

(58) Field of Classification Search
None
See application file for complete search history.

(56) References Cited

U.S. PATENT DOCUMENTS

| 2016/0105264 A1 | 4/2016 | Chen et al. |
| 2016/0337931 A1 | 11/2016 | Wang et al. |

(Continued)

OTHER PUBLICATIONS

Intel Corporation: "NB-IoT Reference Signal Design", 3GPP Draft; R1-160412—Intel NB-IOT NB-RS, 3rd Generation Partnership Project (3GPP), Mobile Competence Centre; 650, Route Des Lucioles; F-06921 Sophia-Antipolis Cedex; France, vol. RAN WG1, No. St Julian's, Malta; Feb. 15, 2016-Feb. 19, 2016 Feb. 6, 2016, XP051064171, Retrieved from the Internet: URL:http://www.3gpp.org/ftp/tsg_ran/WG1_RL1/TSGR1_84/Docs/ [retrieved on Feb. 6, 2016], 4 pages.

(Continued)

*Primary Examiner* — Noel R Beharry
*Assistant Examiner* — Lionel Preval
(74) *Attorney, Agent, or Firm* — Nerrie M. Zohn

(57) ABSTRACT

Techniques described herein permit a narrowband Internet of Things (NB-IoT) user equipment (UE) to combine narrowband reference signals (NRS) with other signals, which the NB-IoT UE already receives, to improve measurement accuracy. These other signals may require different modifications to be combined with the NRS depending on the type of signal. Techniques described herein provide indications of how the UE is to combine different types of signals with an NRS in order to improve measurement accuracy.

31 Claims, 15 Drawing Sheets

(51) Int. Cl.
  *H04W 4/70* (2018.01)
  *H04W 52/32* (2009.01)
  *H04W 48/12* (2009.01)
  *H04L 27/26* (2006.01)
  *H04L 29/08* (2006.01)
  *H04W 88/02* (2009.01)

(52) U.S. Cl.
  CPC ....... *H04W 52/325* (2013.01); *H04L 27/2601* (2013.01); *H04L 67/12* (2013.01); *H04W 88/02* (2013.01)

(56) References Cited

U.S. PATENT DOCUMENTS

| | | | |
|---|---|---|---|
| 2017/0048760 A1 | 2/2017 | Vajapeyam et al. | |
| 2018/0123849 A1* | 5/2018 | Si | H04J 11/0073 |
| 2018/0124744 A1 | 5/2018 | Xue et al. | |
| 2018/0192313 A1* | 7/2018 | Axmon | H04L 5/0094 |
| 2018/0198585 A1* | 7/2018 | Lin | H04L 5/0053 |
| 2018/0279143 A1 | 9/2018 | Bhattad et al. | |
| 2019/0029005 A1* | 1/2019 | Bendlin | H04L 5/0053 |
| 2019/0036746 A1 | 1/2019 | Hwang et al. | |
| 2019/0327651 A1* | 10/2019 | Yiu | H04W 36/0058 |
| 2019/0364452 A1* | 11/2019 | Hwang | H04W 24/10 |
| 2020/0022010 A1* | 1/2020 | Kim | H04W 16/14 |

OTHER PUBLICATIONS

International Search Report and Written Opinion—PCT/US2018/020212—ISA/EPO—dated May 8, 2018.

Samsung: "Remaining Issues of Reference Signal Design", 3GPP Draft; R1-161928 NB-RS, 3rd Generation Partnership Project (3GPP), Mobile Competence Centre, 650, Route Des Lucioles, F-06921 Sophia-Antipolis Cedex, France, vol. RAN WG1, No. Sophia Antipolis, France; Mar. 22, 2016-Mar. 24, 2016 Mar. 16, 2016, XP051081045, Retrieved from the Internet: URL:http://www.3gpp.org/ftp/tsg_ran/WG1_RL1/TSGR1_AH/LTE_NB-IoT_1603/Docs/ [retrieved on Mar. 16, 2016], 3 pages.

ZTE: "Remaining Issues on NB-RS for NB-IoT", 3GPP Draft; R1-161864 NB-RS, 3rd Generation Partnership Project (3GPP), Mobile Competence Centre, 650, Route Des Lucioles, F-06921 Sophia-Antipolis Cedex, France, vol. RAN WG1, No. Sophia Antipolis, France; Mar. 22, 2016-Mar. 24, 2016 Mar. 16, 2016, XP051080981, Retrieved from the Internet: URL:http://www.3gpp.org/ftp/tsg_ran/WG1_RL1/TSGR1_AH/LTE_NB-IoT_1603/Docs/ [retrieved on Mar. 16, 2016], 3 pages.

* cited by examiner

TECHNIQUES AND APPARATUSES FOR SIGNAL QUALITY MEASUREMENTS FOR NARROWBAND INTERNET OF THINGS (NB-IOT) DEVICES

CROSS-REFERENCE TO RELATED APPLICATIONS UNDER 35 U.S.C. § 119

This application claims priority to Indian Patent Application No. 201741010252, filed Mar. 23, 2017, entitled "TECHNIQUES AND APPARATUSES FOR SIGNAL QUALITY MEASUREMENTS FOR NARROWBAND INTERNET OF THINGS (NB-IOT) DEVICES," which is hereby expressly incorporated by reference herein.

BACKGROUND

Field

Aspects of the present disclosure generally relate to wireless communication, and more particularly to techniques and apparatuses for signal quality measurements for narrowband Internet of Things (NB-IoT) devices.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a 5G BS, a 5G Node B, and/or the like.

The above multiple access technologies have been adopted in various telecommunication standards to provide a common protocol that enables different wireless communication devices to communicate on a municipal, national, regional, and even global level. 5G, which may also be referred to as New radio (NR), is a set of enhancements to the LTE mobile standard promulgated by the Third Generation Partnership Project (3GPP). 5G is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread ODFM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

In narrowband LTE, also referred to as LTE-M (e.g., LTE Machine-to-Machine), UEs, such as NB-IoT UEs, may make less accurate measurements as compared to UEs in legacy LTE. For example, an NB-IoT UE may make less accurate measurements due to operating in a narrower bandwidth than legacy LTE UEs, communicating with less frequency diversity than legacy LTE UEs (e.g., due to the narrower bandwidth), and/or being designed for lower coverage levels than legacy LTE UEs. In some cases, measurement accuracy could be improved if an NB-IoT UE were to measure more reference signals from a base station (e.g., more narrowband reference signals). However, increasing the number of measurements drains battery power more quickly.

SUMMARY

Techniques described herein permit an NB-IoT UE to combine NRS with other signals, which the NB-IoT UE already receives, to improve measurement accuracy. These other signals may require different modifications to be combined with the NRS depending on the type of signal. Techniques described herein provide indications of how the UE is to combine different types of signals with an NRS in order to improve measurement accuracy. Furthermore, since many NB-IoT UEs are relatively stationary as compared to legacy UEs that are mobile, techniques described herein conserve battery power for stationary UEs by using different measurement parameters as compared to mobile UEs. For example, techniques described herein may use different thresholds for reporting measurement events for stationary UEs and mobile UEs. Such thresholds are designed to conserve battery power for stationary UEs. Furthermore, techniques described herein may use different reporting time requirements (e.g., an amount of time between when a UE receives a request for a measurement report and provides the measurement report; an amount of time between when a measurement event, such as a neighboring cell becoming stronger than a serving cell, occurs and a time when the UE sends a report of the event or initiates an action because of the event; and/or the like) for stationary UEs and mobile UEs so as to conserve battery power for stationary UEs.

In an aspect of the disclosure, a method, a device, an apparatus, and a computer program product are provided.

In some aspects, the method may include receiving, by a user equipment (UE), a signal to be combined with a narrowband reference signal to determine a combined signal quality parameter, wherein the signal is not a narrowband reference signal; receiving, by the UE, an indication of a manner in which the signal is to be combined with the narrowband reference signal to determine the combined signal quality parameter; and determining, by the UE, the combined signal quality parameter based at least in part on combining the signal and the narrowband reference signal in the indicated manner.

In some aspects, the device may include a memory and at least one processor coupled to the memory. The at least one processor may be configured to receive a signal to be combined with a narrowband reference signal to determine a combined signal quality parameter, wherein the signal is not a narrowband reference signal; receive an indication of a manner in which the signal is to be combined with the narrowband reference signal to determine the combined signal quality parameter; and determine the combined signal quality parameter based at least in part on combining the signal and the narrowband reference signal in the indicated manner.

In some aspects, the apparatus may include means for receiving a signal to be combined with a narrowband reference signal to determine a combined signal quality parameter, wherein the signal is not a narrowband reference signal; means for receiving an indication of a manner in which the signal is to be combined with the narrowband reference signal to determine the combined signal quality parameter; and means for determining the combined signal quality parameter based at least in part on combining the signal and the narrowband reference signal in the indicated manner.

In some aspects, the computer program product may include a non-transitory computer-readable medium storing one or more instructions for wireless communication. The one or more instructions, when executed by one or more processors, may cause the one or more processors to receive a signal to be combined with a narrowband reference signal to determine a combined signal quality parameter, wherein the signal is not a narrowband reference signal; receive an indication of a manner in which the signal is to be combined with the narrowband reference signal to determine the combined signal quality parameter; and determine the combined signal quality parameter based at least in part on combining the signal and the narrowband reference signal in the indicated manner.

Aspects generally include a method, apparatus, system, computer program product, non-transitory computer-readable medium, user equipment, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

DETAILED DESCRIPTION

Figure 1:
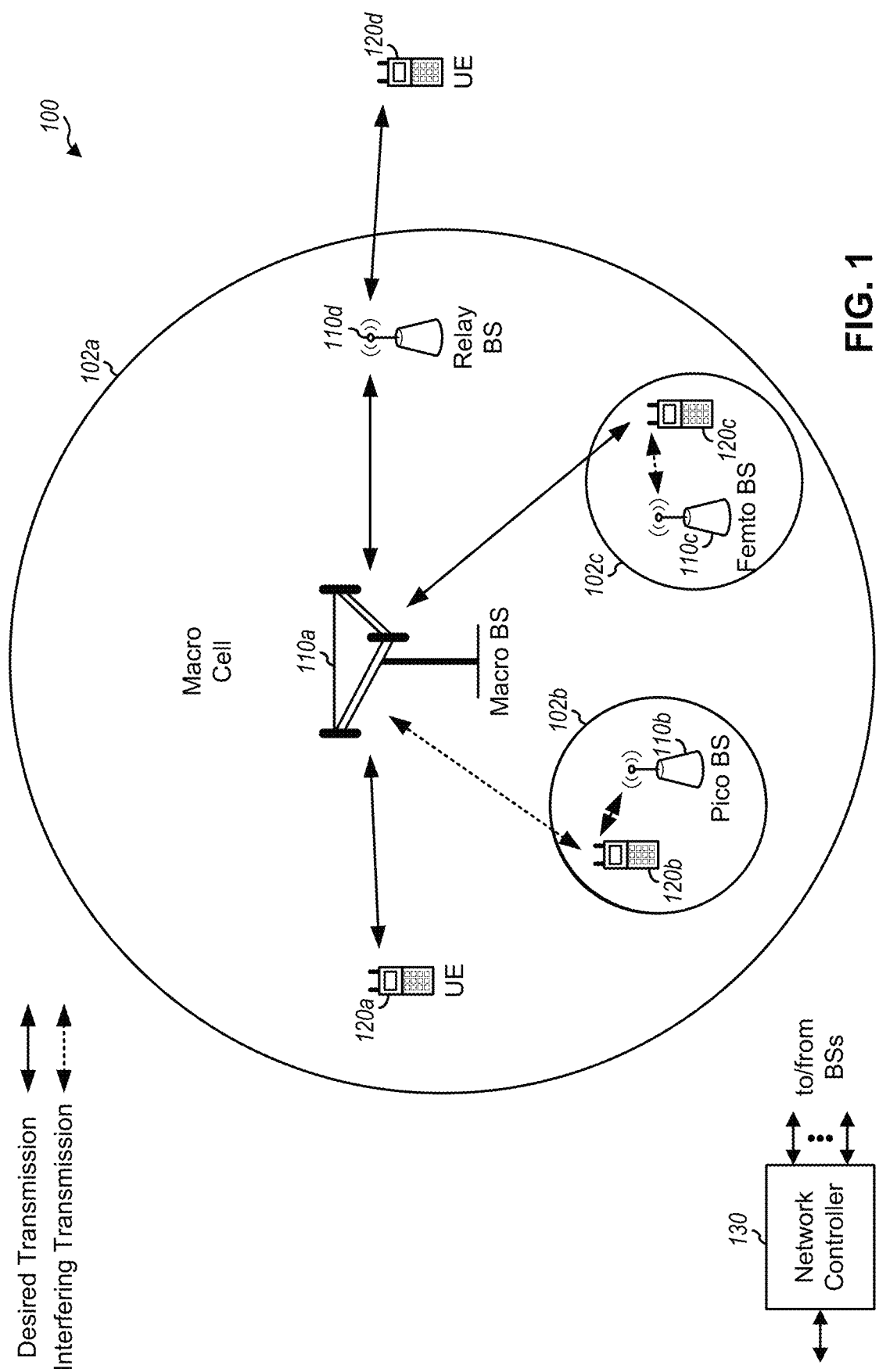
FIG. 1 is diagram illustrating an example of a wireless communication network.

The detailed description set forth below in connection with the appended drawings is intended as a description of various configurations and is not intended to represent the only configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

An access point ("AP") may comprise, be implemented as, or known as a NodeB, a Radio Network Controller ("RNC"), an eNodeB (eNB), a Base Station Controller ("BSC"), a Base Transceiver Station ("BTS"), a Base Station ("BS"), a Transceiver Function ("TF"), a Radio Router, a Radio Transceiver, a Basic Service Set ("BSS"), an Extended Service Set ("ESS"), a Radio Base Station ("RBS"), a Node B (NB), a gNB, a 5G NB, a 5G BS, a Transmit Receive Point (TRP), or some other terminology.

An access terminal ("AT") may comprise, be implemented as, or be known as an access terminal, a subscriber station, a subscriber unit, a mobile station, a remote station, a remote terminal, a user terminal, a user agent, a user device, user equipment (UE), a user station, a wireless node, or some other terminology. In some aspects, an access terminal may comprise a cellular telephone, a smart phone, a cordless telephone, a Session Initiation Protocol ("SIP") phone, a wireless local loop ("WLL") station, a personal digital assistant ("PDA"), a tablet, a netbook, a smartbook, an ultrabook, a handheld device having wireless connection capability, a Station ("STA"), or some other suitable processing device connected to a wireless modem. Accordingly, one or more aspects taught herein may be incorporated into a phone (e.g., a cellular phone, a smart phone), a computer (e.g., a desktop), a portable communication device, a portable computing device (e.g., a laptop, a personal data assistant, a tablet, a netbook, a smartbook, an ultrabook), wearable device (e.g., smart watch, smart glasses, smart bracelet, smart wristband, smart ring, smart clothing, and/or the like), medical devices or equipment, biometric sensors/devices, an entertainment device (e.g., music device, video device, satellite radio, gaming device, and/or the like), a vehicular component or sensor, smart meters/sensors, industrial manufacturing equipment, a global positioning system device, or any other suitable device that is configured to communicate via a wireless or wired medium. In some aspects, the node is a wireless node. A wireless node may provide, for example, connectivity for or to a network (e.g., a wide area network such as the Internet or a cellular network) via a wired or wireless communication link. Some UEs may be considered machine-type communication (MTC) UEs, which may include remote devices that may communicate with a base station, another remote device, or some other entity. Machine type communications (MTC) may refer to communication involving at least one remote device on at least one end of the communication and may include forms of data communication which involve one or more entities that do not necessarily need human interaction. MTC UEs may include UEs that are capable of MTC communications with MTC servers and/or other MTC devices through Public Land Mobile Networks (PLMN), for example. Examples of MTC devices include sensors, meters, location tags, monitors, drones, robots/robotic devices, and/or the like. In some aspects, MTC devices may be referred to as enhanced MTC (eMTC) devices, LTE category M1 (LTE-M) devices, machine to machine (M2M) devices, and/or the like. Additionally, or alternatively, some UEs may be narrowband Internet of things (NB-IoT) devices.

It is noted that while aspects may be described herein using terminology commonly associated with 3G and/or 4G wireless technologies, aspects of the present disclosure can be applied in other generation-based communication systems, such as 5G and later.

FIG. 1 is a diagram illustrating a network 100 in which aspects of the present disclosure may be practiced. The network 100 may be an LTE network or some other wireless network, such as a 5G network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a 5G BS, a Node B, a gNB, a 5G NB, an access point, a TRP, and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. Some UEs may be considered evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link.

Some UEs may be considered Internet-of-Things (IoT) devices, such as NB-IoT devices. NB-IoT UEs may make less accurate measurements as compared to UEs in legacy LTE. For example, an NB-IoT UE may make less accurate measurements due to operating in a narrower bandwidth than legacy LTE UEs, communicating with less frequency diversity than legacy LTE UEs (e.g., due to the narrower bandwidth), and/or being designed for lower coverage levels than legacy LTE UEs. In some cases, measurement accuracy could be improved if an NB-IoT UE were to measure more reference signals from a base station (e.g., more narrowband reference signals). However, increasing the number of measurements drains battery power more quickly. Techniques described herein permit an NB-IoT UE to combine NRS with other signals, that the NB-IoT UE already receives, to improve measurement accuracy.

In FIG. 1, a solid line with double arrows indicates desired transmissions between a UE and a serving BS, which is a BS designated to serve the UE on the downlink and/or uplink. A dashed line with double arrows indicates potentially interfering transmissions between a UE and a BS.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
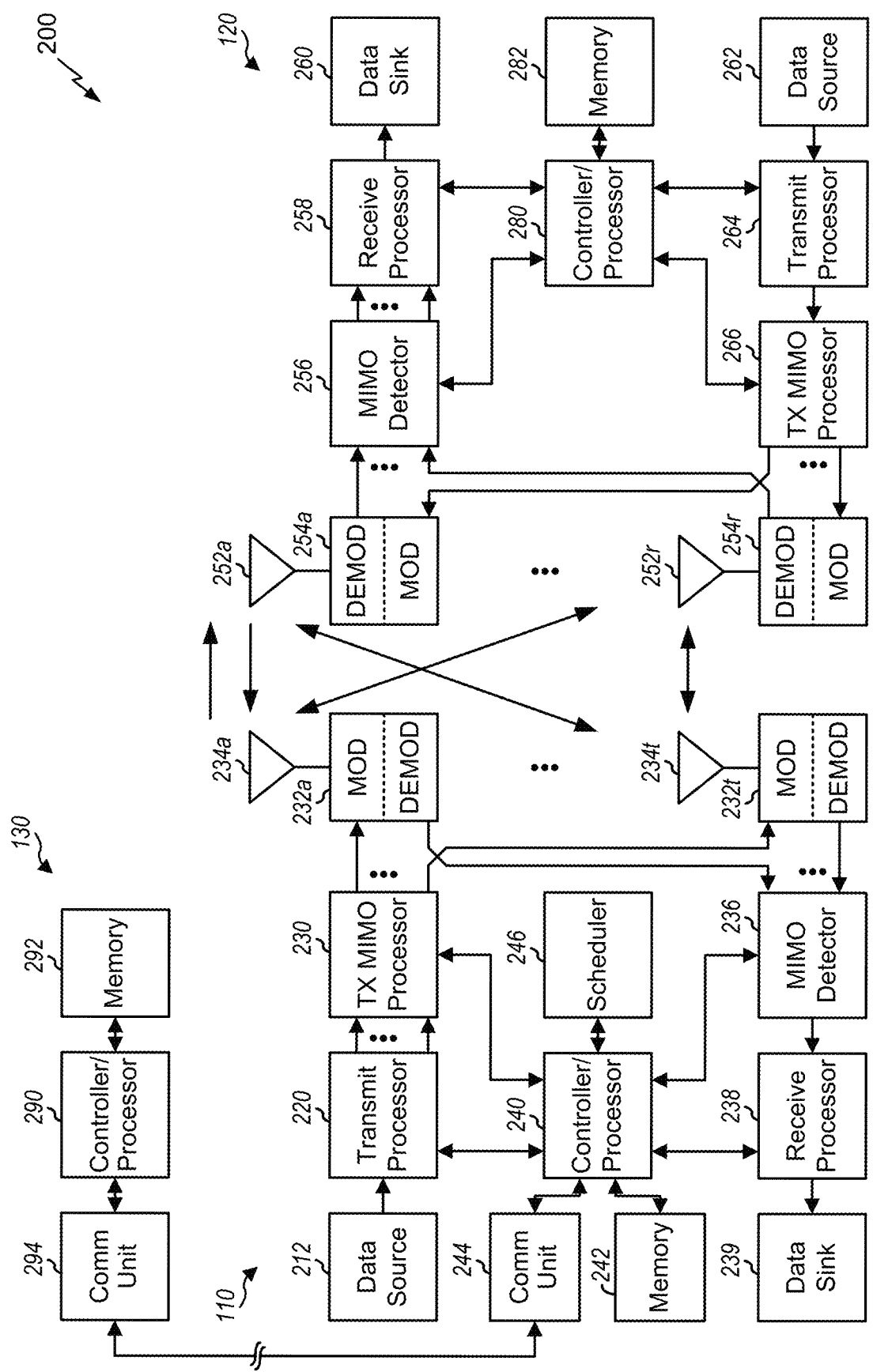
FIG. 2 is a diagram illustrating an example of a base station in communication with a user equipment (UE) in a wireless communication network.

FIG. 2 shows a block diagram 200 of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the CRS) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

According to certain aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controllers/processors 240 and 280 and/or any other component(s) in FIG. 2 may direct the operation at base station 110 and UE 120, respectively, to perform signal quality measurements for NB-IoT devices. For example, controller/processor 240 of base station 110 and/or controller/processor 280 of UE 120 may perform signal quality measurements for NB-IoT devices, as described in more detail elsewhere herein. For example, controller/processor 240, controller/processor 280, and/or other controllers/processors and modules of BS 110 and/or UE 120 may perform or direct operations of, for example, method 1000 of FIG. 10, method 1100 of FIG. 11, method 1200 of FIG. 12, method 1300 of FIG. 13, and/or other processes as described herein. In some aspects, one or more of the components shown in FIG. 2 may be employed to perform example method 1000 of FIG. 10, method 1100 of FIG. 11, method 1200 of FIG. 12, method 1300 of FIG. 13, and/or other processes for the techniques described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples are possible and may differ from what was described with regard to FIG. 2.

Figure 3:
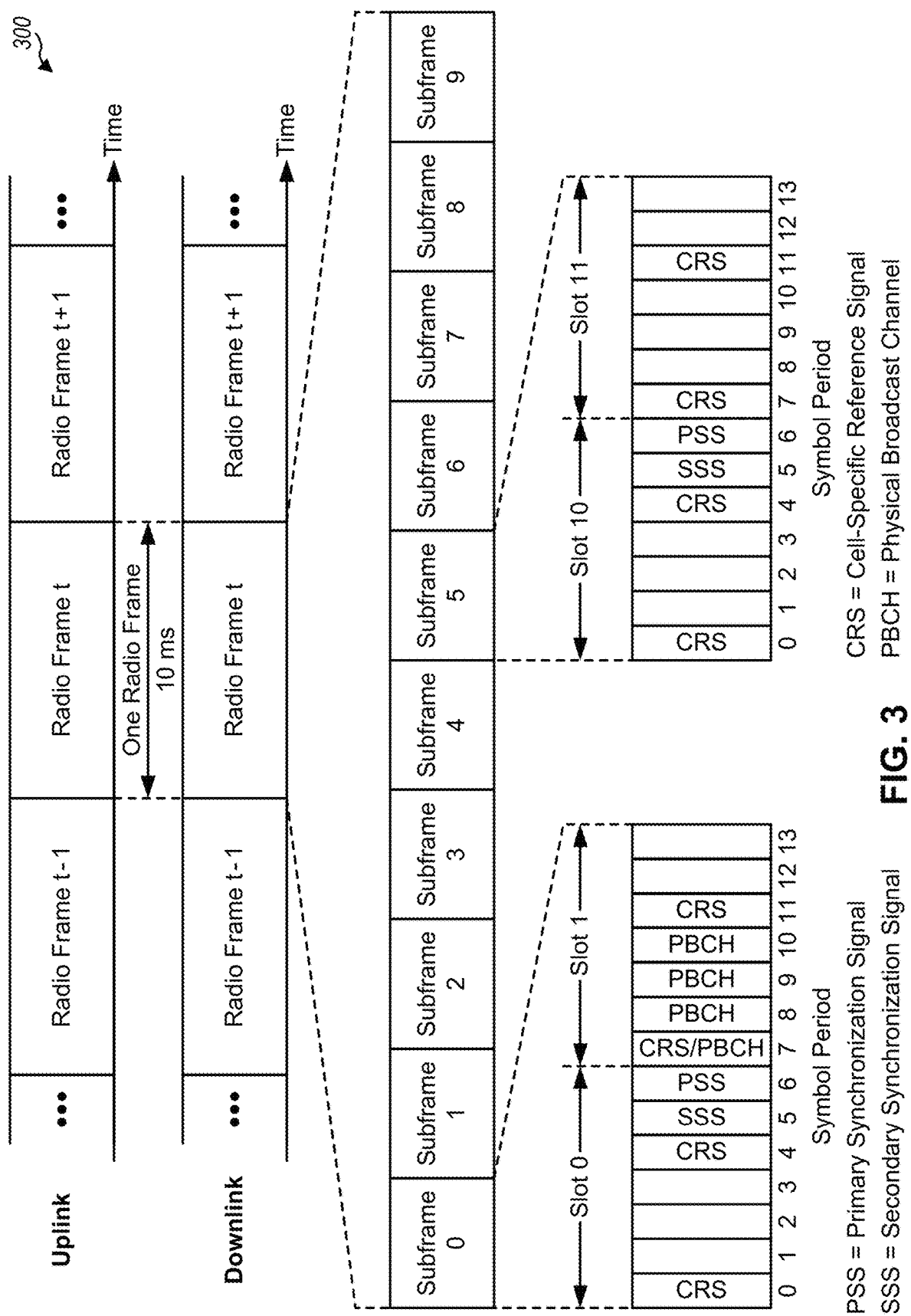
FIG. 3 is a diagram illustrating an example of a frame structure in a wireless communication network.

FIG. 3 shows an example frame structure 300 for FDD in a telecommunications system (e.g., LTE). The transmission timeline for each of the downlink and uplink may be partitioned into units of radio frames. Each radio frame may be partitioned into subframes. Each subframe may include a number of slots. Each slot may include L symbol periods, e.g., seven symbol periods for a normal cyclic prefix (as shown in FIG. 3) or six symbol periods for an extended cyclic prefix.

While some techniques are described herein in connection with frames, subframes, slots, and/or the like, these techniques may equally apply to other types of wireless communication structures, which may be referred to using terms other than "frame," "subframe," "slot," and/or the like in 5G.

In certain telecommunications (e.g., LTE), a BS may transmit a primary synchronization signal (PSS) and a secondary synchronization signal (SSS) on the downlink in the center of the system bandwidth for each cell supported by the BS. The PSS and SSS may be transmitted in symbol periods 6 and 5, respectively, in subframes 0 and 5 of each radio frame with the normal cyclic prefix, as shown in FIG. 3. The PSS and SSS may be used by UEs for cell search and acquisition. The BS may transmit a cell-specific reference signal (CRS) across the system bandwidth for each cell supported by the BS. The CRS may be transmitted in certain symbol periods of each subframe and may be used by the UEs to perform channel estimation, channel quality measurement, and/or other functions. The BS may also transmit a physical broadcast channel (PBCH) in symbol periods 0 to 3 in slot 1 of certain radio frames. The PBCH may carry some system information. The BS may transmit other system information such as system information blocks (SIBs) on a physical downlink shared channel (PDSCH) in certain subframes. The BS may transmit control information/data on a physical downlink control channel (PDCCH) in the first B symbol periods of a subframe, where B may be configurable for each subframe. The BS may transmit traffic data and/or other data on the PDSCH in the remaining symbol periods of each subframe. As described in more detail elsewhere herein, one or more of these signals may be combined with an NRS for more accurate measurements.

In other systems (e.g., such as 5G systems), a Node B may transmit these or other signals in these locations or in different locations of the subframe.

As indicated above, FIG. 3 is provided merely as an example. Other examples are possible and may differ from what was described with regard to FIG. 3.

Figure 4:
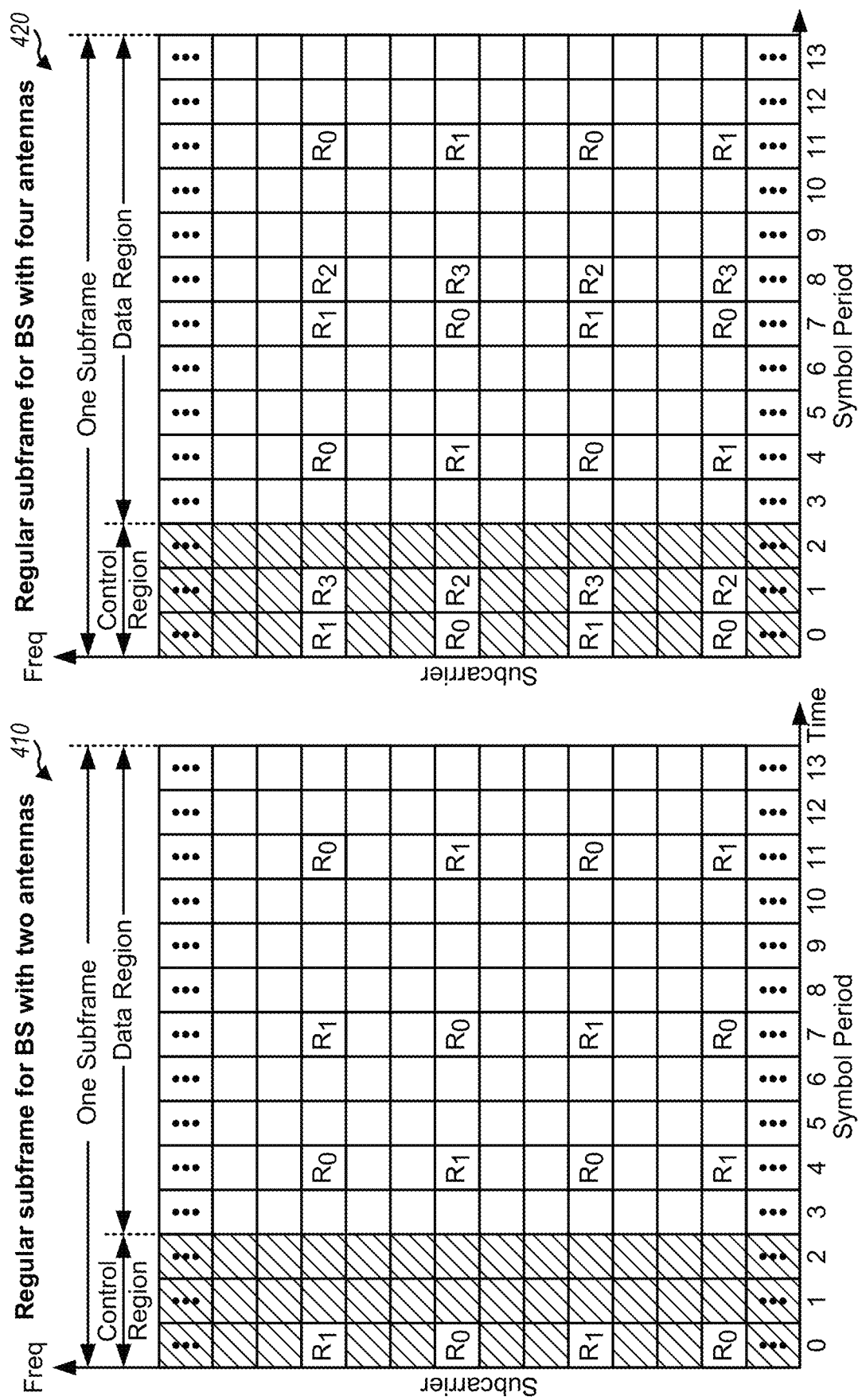
FIG. 4 is a diagram illustrating two example subframe formats with the normal cyclic prefix.

FIG. 4 shows two example subframe formats 410 and 420 with the normal cyclic prefix. The available time frequency resources may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based at least in part on a cell identity (ID). In FIG. 4, for a given resource element with label Ra, a modulation symbol may be transmitted on that resource element from antenna a, and no modulation symbols may be transmitted on that resource element from other antennas. Subframe format 420 may be used with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based at least in part on cell ID. CRSs may be transmitted on the same or different subcarriers, depending on their cell IDs. For both subframe formats 410 and 420, resource elements not used for the CRS may be used to transmit data (e.g., traffic data, control data, and/or other data).

The PSS, SSS, CRS and PBCH in LTE are described in 3GPP TS 36.211, entitled "Evolved Universal Terrestrial Radio Access (E-UTRA); Physical Channels and Modulation," which is publicly available. As described in more detail elsewhere herein, one or more of these signals may be combined with an NRS for more accurate measurements.

While aspects of the examples described herein may be associated with LTE technologies, aspects of the present disclosure may be applicable with other wireless communication systems, such as 5G technologies.

5G may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, 5G may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, 5G may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. 5G may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHZ may be supported. 5G resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, 5G may support a different air interface, other than an OFDM-based interface. 5G networks may include entities such central units or distributed units.

The RAN may include a central unit (CU) and distributed units (DUs). A 5G BS (e.g., gNB, 5G Node B, Node B, transmit receive point (TRP), access point (AP)) may correspond to one or multiple BSs. 5G cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases, DCells may not transmit synchronization signals—in some case cases DCells may transmit SS. 5G BSs may transmit downlink signals to UEs indicating the cell type. Based at least in part on the cell type indication, the UE may communicate with the 5G BS. For example, the UE may determine 5G BSs to consider for cell selection, access, handover, and/or measurement based at least in part on the indicated cell type.

As indicated above, FIG. 4 is provided merely as an example. Other examples are possible and may differ from what was described with regard to FIG. 4.

Figure 5:
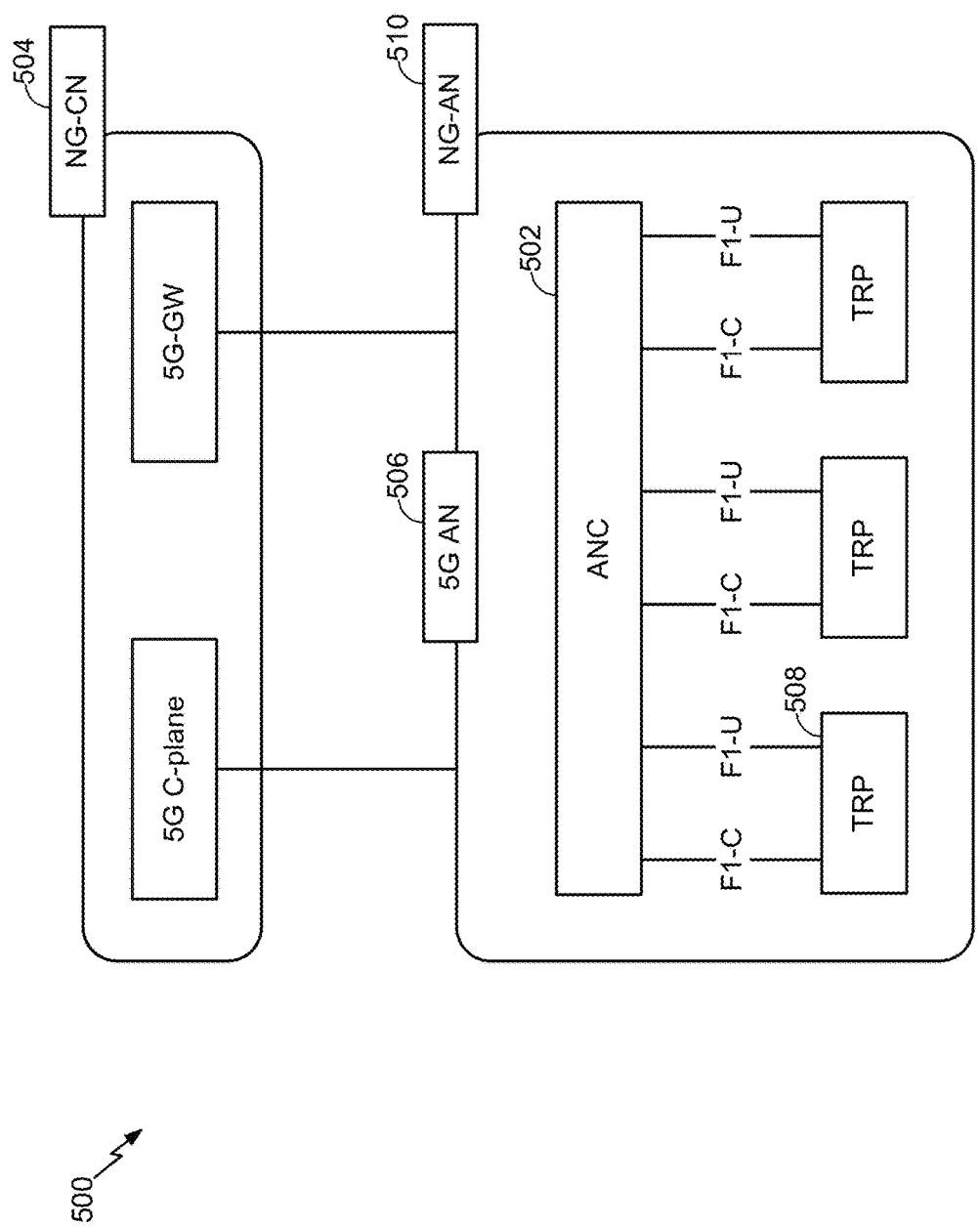
FIG. 5 is a diagram illustrating an example logical architecture of a distributed radio access network (RAN).

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, 5G BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with 5G. The NG-AN may share a common fronthaul for LTE and 5G.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The PDCP, RLC, MAC protocol may be adaptably placed at the ANC or TRP.

According to certain aspects, a BS may include a central unit (CU) (e.g., ANC 502) and/or one or more distributed units (e.g., one or more TRPs 508).

As indicated above, FIG. 5 is provided merely as an example. Other examples are possible and may differ from what was described with regard to FIG. 5.

Figure 6:
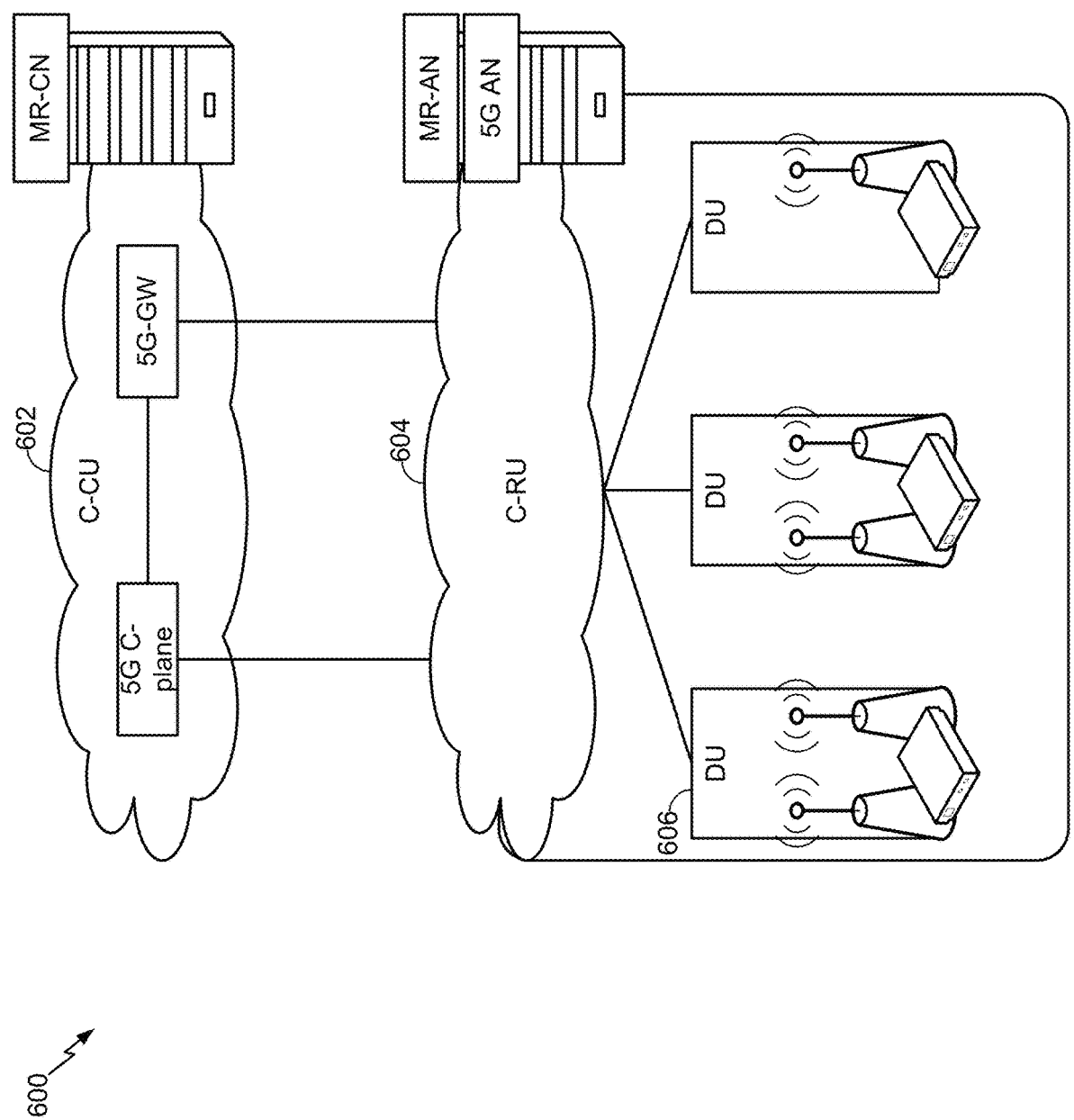
FIG. 6 is a diagram illustrating an example physical architecture of a distributed RAN.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples are possible and may differ from what was described with regard to FIG. 6.

In narrowband LTE, also referred to as LTE-M (e.g., LTE Machine-to-Machine), UEs, such as NB-IoT UEs, may make less accurate measurements as compared to UEs in legacy LTE. For example, an NB-IoT UE may make less accurate measurements due to operating in a narrower bandwidth than legacy LTE UEs, communicating with less frequency diversity than legacy LTE UEs (e.g., due to the narrower bandwidth), and/or being designed for lower coverage levels than legacy LTE UEs (e.g. due to operation at much lower SINRs than legacy LTE UEs). In some cases, measurement accuracy could be improved if an NB-IoT UE were to measure more reference signals from a base station (e.g., narrowband reference signals observed over a longer period of time). However, increasing the number of measurements drains battery power more quickly. Techniques described herein permit an NB-IoT UE to combine NRS with other signals, that the NB-IoT UE already receives, to improve measurement accuracy. These other signals may require different modifications to be combined with the NRS depending on the type of signal. Furthermore, additional information about these other signals may need to be communicated to the UE in order to enable the UE to use these signals for measurements. Techniques described herein provide indications of which signal(s) to be used and/or additional information about the signal(s), to enable the UE to use different types of signals in combination with or instead of NRS in order to improve measurement accuracy.

Furthermore, since many NB-IoT UEs are relatively stationary as compared to legacy UEs that are mobile, techniques described herein conserve battery power for stationary UEs by using different measurement parameters as compared to mobile UEs. For example, techniques described herein may use different thresholds for reporting measurements events for stationary UEs and mobile UEs. Such thresholds are designed to conserve battery power for stationary UEs. Furthermore, techniques described herein may use different reporting time requirements (e.g., an amount of time between when a UE receives a request for a measurement report and provides the measurement report; an amount of time between when a measurement event, such as a neighboring cell becoming stronger than a serving cell, occurs and a time when the UE sends a report of the event or initiates an action because of the event; and/or the like) for stationary UEs and mobile UEs so as to conserve battery power for stationary UEs.

Figure 7:
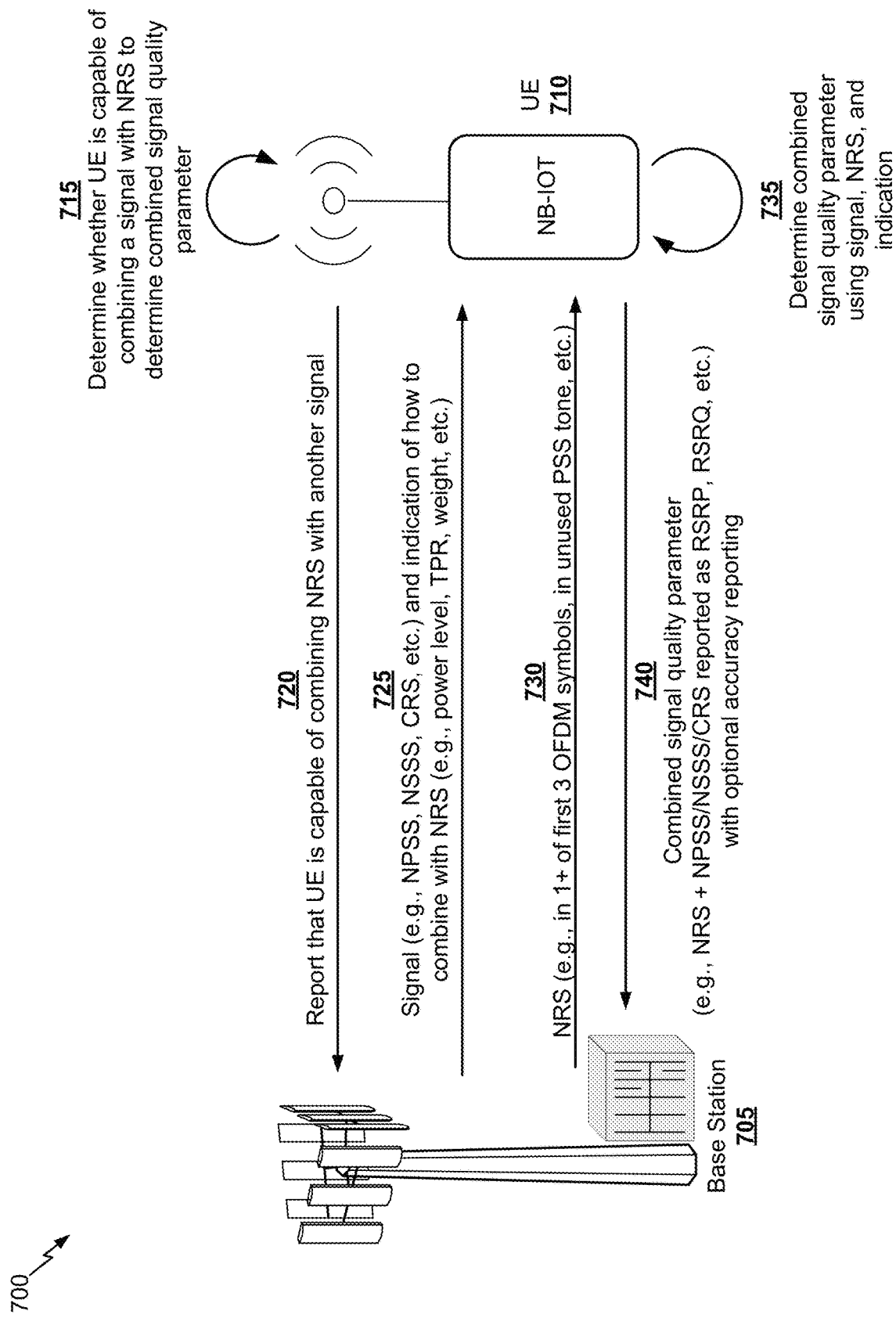
FIGS. 7-9 are diagrams illustrating examples of signal quality measurements for NB-IoT devices.

FIG. 7 is a diagram illustrating an example 700 of signal quality measurements for NB-IoT devices. As shown in FIG. 7, a base station 705 and a UE 710 may communicate with one another. The base station 705 may correspond to, for example, the base station 110 of FIG. 1 and/or the like. The UE 710 may correspond to, for example, the UE 120 of FIG. 1 and/or the like. In some aspects, the UE 710 may be an NB-IoT UE, an MTC UE, an eMTC UE, an LTE-M UE, an M2M UE, and/or the like. For example, the UE 710 may be an NB-IoT UE, as shown in FIG. 7.

As shown by reference number 715, the UE 710 may determine whether the UE 710 is capable of combining a signal with an NRS to determine a combined signal quality parameter. In some aspects, the signal is not an NRS (e.g., is a signal other than an NRS). In some aspects, the signal is a signal that the UE 710 is already configured to receive and process for a purpose other than determining a signal quality parameter to be reported to the base station 705 (e.g., a reference signal received power (RSRP) parameter, a reference signal received quality (RSRQ) parameter, and/or the like). For example, the signal may include a primary synchronization signal (PSS) (e.g., a narrowband PSS), a secondary synchronization signal (SSS) (e.g., a narrowband SSS), a physical broadcast channel (PBCH) signal (e.g., a narrowband PBCH signal), a system information block (SIB), a positioning reference signal (PRS), a cell-specific reference signal (CRS), and/or the like.

As shown by reference number 720, the UE 710 may report whether the UE 710 is capable of combining the signal with the NRS. In example 700, the UE 710 is capable of combining the signal with the NRS, and reports that the UE 710 is capable of combining the signal with the NRS to determine the combined signal quality parameter.

As shown by reference number 725, the UE 710 may receive, from the base station 705, a signal to be combined with an NRS, additional parameters that enable the use of the signal to be used for measurements or to be able to combine the signal with NRS for measurements, and an indication of a manner in which the signal is to be combined with the NRS (e.g., based at least in part on reporting that the UE 710 is capable of combining the signal with the NRS). In some aspects, the signal is not an NRS (e.g., is a signal other than an NRS). In some aspects, the UE 710 may receive the signal and the indication together or within a threshold amount of time of one another (e.g., in a same subframe, within a threshold number of subframes, and/or the like). In some aspects, the UE 710 may receive the signal and the indication separately. For example, the UE 710 may receive the indication as part of a radio resource control (RRC) configuration procedure, and the signal may be received at a later time. Additionally, or alternatively, the indication may be broadcast by the base station 705.

In some aspects, the signal is a signal that the UE 710 is already configured to receive and process for a purpose other than determining a signal quality parameter to be reported to the base station 705, as described above.

The indication may indicate, for example, whether to combine the signal with the NRS, a power level of the signal relative to the NRS, a traffic-to-pilot ratio (TPR) of the signal, a weight to be applied to the signal and/or the NRS when determining a combined signal quality parameter, a degree to which the signal is similar to a corresponding signal on a neighbor cell, and/or the like. Additional details are provided below.

In some aspects, the signal may be a PSS, such as a narrowband PSS (NPSS). In this case, the base station 705 may indicate whether the UE 710 is to combine the PSS with the NRS to generate combined signal quality parameters. For example, the PSS may be the same across multiple cells (e.g., a serving cell of the UE 710 and one or more neighbor cells of the UE 710), which may lead to less accurate measurements due to interference of PSS from multiple cells and an inability to differentiate PSS signals for different cells to determine combined signal quality parameters for the different cells. In this case (e.g., when the network is synchronous), the base station 705 may indicate that the UE 710 is not to use the PSS to determine the combined signal quality parameters. However, if the network is asynchronous or utilizes frequency reuse, and different cells have different PSS, the base station 705 may indicate that the UE 710 is to use the PSS to determine the combined signal quality parameters. Additionally, or alternatively, the base station 705 may indicate a power level of the PSS relative to the NRS, a TPR of the PSS (e.g., relative to the NRS), a weight to be applied to the PSS (e.g., relative to the NRS) when determining the combined signal quality parameters, a weight to be applied to the NRS, and/or the like.

Additionally, or alternatively, the signal may be an SSS, such as a narrowband SSS (NSSS). In some aspects, different cells may use different SSS, so the scenario described above with respect to PSS may be avoided. Thus, in this case, the UE 710 may be capable of associating different SSS with different cells in order to generate combined signal quality parameters for the different cells using the different SSS. In some aspects, the base station 705 may indicate whether the UE 710 is to combine the SSS with the NRS to generate combined signal quality parameters, a power level of the SSS relative to the NRS, a TPR of the SSS (e.g., relative to the NRS), a weight to be applied to the SSS (e.g., relative to the NRS) when determining the combined signal quality parameters, a weight to be applied to the NRS, and/or the like.

Additionally, or alternatively, the signal may be a PBCH signal, such as a narrowband PBCH (NPBCH) signal. In some cases, PBCH signals may be the same or similar (e.g., may share a threshold degree of similarity) across multiple cells. If the PBCH signals are not the same or similar among the serving cell and neighbor cell(s), the base station 705 (e.g., of the serving cell) may indicate that the UE 710 is not to combine the PBCH with the NRS to generate combined signal quality parameters. If the PBCH signals are the same or similar among the serving cell and neighbor cells, the base station 705 (e.g., of the serving cell) may indicate that the UE 710 is to combine the PBCH with the NRS to generate combined signal quality parameters. In this case, the base station 705 may indicate one or more parameters of the PBCH signal(s) on the neighbor cell(s) that differ from the PBCH signal on the serving cell (e.g., may provide a payload of a neighbor PBCH signal that differs from a payload of the serving PBCH signal). In this way, the UE 710 may construct the payload of the PBCH signal(s) on the neighbor cell(s), and may use this payload to generate combined signal quality parameter(s) for the neighbor cell(s). Additionally, or alternatively, the base station 705 may indicate whether the UE 710 is to combine the PBCH signal with the NRS to generate combined signal quality parameters, a power level of the PBCH signal relative to the NRS, a TPR of the PBCH signal (e.g., relative to the NRS), a weight to be applied to the PBCH signal (e.g., relative to the NRS) when determining the combined signal quality parameters, a weight to be applied to the NRS, and/or the like. In some aspects, one or more of the above indications may be transmitted in the PBCH. Additionally, or alternatively, PBCH signals may be cross-correlated across radio frames to determine the combined signal quality parameter.

In some cases, more accurate measurements are needed for a serving cell as compared to a neighbor cell. For example, when the UE 710 has to send a random access channel (RACH) message, the UE 710 needs to know the received power level of the serving cell. In this case, the PBCH may be used for measurements of the serving cell but not for neighbor cells. Use of such enhancements that only improve measurement quality for the serving cell are hence still useful. Since the UE 710 may store information about the PBCH payload of the serving cell since the UE 710 may have decoded such information in the past, such a design is also feasible. The PBCH payload typically has a few reserved bits and, to enable such measurements, the base station 705 may inform the UE 710 that the reserved bits have not changed or will not change (e.g., for a certain period of time) or the UE 710 may assume that the reserved bits are the same as the previously decoded reserved bits.

Additionally, or alternatively, the signal may be a SIB, such as a narrowband SIB (NSIB). In some cases, SIB signals may be the same or similar (e.g., may share a threshold degree of similarity) across multiple cells. Thus, the base station 705 may indicate whether the UE 710 is to combine the SIB with the NRS to generate combined signal quality parameters based at least in part on whether SIB signals are the same or similar among the serving cell and neighbor cell(s), in a similar manner as described above in connection with PBCH signals. Additionally, or alternatively, the base station 705 may indicate one or more parameters of the SIB(s) on the neighbor cell(s) that differ from the SIB on the serving cell (e.g., may provide a payload of a neighbor SIB that differs from a payload of the serving SIB), in a similar manner as described above in connection with PBCH signals. Additionally, or alternatively, the base station 705 may indicate whether the UE 710 is to combine the SIB with the NRS to generate combined signal quality parameters, a power level of the SIB relative to the NRS, a TPR of the SIB (e.g., relative to the NRS), a weight to be applied to the SIB (e.g., relative to the NRS) when determining the combined signal quality parameters, a weight to be applied to the NRS, and/or the like. In some aspects, one or more of the above indications may be transmitted in the SIB. The SIB may include, for example, SIB block 1 (SIB1) and/or another SIB.

Additionally, or alternatively, the signal may be a PRS, such as a narrowband PRS (NPRS). In some implementations, the signal may be similar to a PRS, except that the signal may not be associated with a muting sequence or a muting pattern. Additionally, or alternatively, the signal may occur periodically on one or more subframes. The subframes may be contiguous or nearly contiguous (e.g., within a threshold number of subframes). When nearly contiguous, the subframes may be contiguous except for intervening subframes that include, for example, a PSS, an SSS, a PBCH, a SIB, an invalid subframe, and/or the like. In some aspects, the subframes used for the signal to be combined with the NRS (e.g., the subframes that include the PRS and/or the like) may be time-aligned across multiple cells so that the UE 710 may wake up, measure the signal across multiple cells at the same time, and return to a sleep state, thereby conserving battery power. In some aspects, the subframes used for the signal to be combined with the NRS may be carried on an anchor carrier (e.g., a dedicated carrier used for measurements). In some aspects, the subframes used for the signal to be combined with the NRS may be on a different carrier than the anchor carrier. Additionally, or alternatively, the signal to be combined with the NRS may be cell-specific so that the UE 710 can associated different signals with different cells when determining combined signal quality parameters for the different cells. In some aspects, the base station 705 may provide one or more indications described above to indicate a manner in which the PRS and/or a related signal is to be combined with the NRS.

Additionally, or alternatively, the signal may be a CRS. In some aspects, the CRS is limited to a bandwidth associated with an NB-IoT carrier. In this way, the base station 705 and the UE 710 may conserve network resources when the UE 710 is constrained to communicating within only an NB-IoT bandwidth (e.g., an NB-IoT carrier). In some aspects, the CRS includes CRS outside of a bandwidth associated with an NB-IoT carrier. In this way, measurement accuracy may be improved (e.g., via frequency diversity) when the UE 710 is capable of communicating outside of the NB-IoT carrier. In some aspects, the base station 705 may indicate whether the UE 710 is to combine the CRS with the NRS to generate combined signal quality parameters, a power level of the CRS relative to the NRS, a TPR of the CRS (e.g., relative to the NRS), a weight to be applied to the CRS (e.g., relative to the NRS) when determining the combined signal quality parameters, a weight to be applied to the NRS, and/or the like. Additionally, or alternatively, the base station 705 may indicate a cell identifier associated with the CRS (e.g., so that the UE 710 can associate the CRS with a cell), one or more parameters to be used by the UE 710 to determine a scrambling code of the CRS in an NB-IoT carrier (e.g., a location of the NB-IoT carrier within an LTE carrier, a number of CRS ports, an MBSFN configuration, and/or the like), information to be used by the UE 710 to decode the CRS, and/or the like.

In some aspects, the UE 710 may combine more than one of the above signals with an NRS to determine a combined signal quality parameter, thereby further improving measurement accuracy. In this case, the base station 705 may indicate one or more signals to be used and/or one or more signals not to be used by the UE 710. This technique improves measurement accuracy without significantly increasing network overhead because the base station 705 may be configured to transmit one or more of these signals regardless of whether the signals are used to report signal quality measurements. In this case, indications for different signals may be different. Additionally, or alternatively, indications for the same signal (or different signals) on different cells may be different. For example, a PBCH signal may be used on a first cell (e.g., due to a similarity among neighbor PBCH signals), but not on a second cell (e.g., due to a dissimilarity among neighbor PBCH signals). As another example, an indicated payload of a PBCH signal may be different on a first cell as compared to a second cell.

As shown by reference number 730, the UE 710 may receive, from the base station 705, the NRS. Although the NRS is shown as being received after the signal to be combined with the NRS and the indication of a manner in which the signal is to be combined with the NRS, the NRS, the signal, and the indication may be received in any order or concurrently. Furthermore, the NRS shown in FIG. 7 may include multiple NRS (e.g., received over multiple subframes), which may be combined, such as by determining an average NRS value, a weighted average NRS value, and/or the like. In some aspects, the NRS may be signaled and/or received in one or more of a first three orthogonal frequency division multiplexing (OFDM) symbols of a subframe. In some aspects, these symbols are unused in the NB-IoT carrier, so this signaling may increase network efficiency and throughput. Additionally, or alternatively, the NRS may be signaled and/or received in subframes otherwise reserved for CRS. Additionally, or alternatively, the NRS may be signaled and/or received in unused PSS tones (e.g., PSS may be signaled in 11 out of 12 tones in a resource block), thereby increasing network efficiency and throughput.

In some aspects, the UE 710 may receive the NRS and/or the signal to be combined with the NRS on multiple carriers, thereby increasing the accuracy of measurements via frequency diversity. In some aspects, the base station 705 may indicate a time (e.g., one or more subframes) when the UE 710 is to measure the NRS (and/or the signal to be combined with the NRS), and the UE 710 may measure the NRS (and/or the signal to be combined with the NRS) at the indicated time. Additionally, or alternatively, the base station 705 may indicate which NRS and/or signals (e.g., on different carriers) are to be combined by the UE 710 to generate a combined signal quality parameter. Additionally, or alternatively, the base station 705 may provide one or more indications described elsewhere herein (e.g., whether to combine, a relative power level, a TPR, a relative TPR, a weight, a relative power boost level across different carriers, and/or the like) for different NRS and/or signals received on different carriers. In some aspects, the UE 710 may make measurements on a non-anchor carrier, such as a carrier used for paging. In this way, the UE 710 may conserve battery power by monitoring fewer carriers (e.g., rather than monitoring an anchor carrier for measurements and a non-anchor carrier for pages).

As shown by reference number 735, the UE 710 may determine one or more combined signal quality parameters (e.g., corresponding to one or more cells) based at least in part on the NRS, the signal to be combined with the NRS, and the indication of the manner in which the signal is to be combined with the NRS. For example, the UE 710 may combine the NRS and the signal based at least in part on an indication of whether to combine the NRS and the signal, a power level (e.g., a relative power level) of the NRS and/or the signal, a TPR (e.g., a relative TPR) of the NRS and/or the signal, a weight (e.g., a relative weight) to be applied to the NRS and/or the signal, and/or the like. In some aspects, the combined signal quality parameter may indicate a signal quality associated with a cell, and may be a more accurate representation of the signal quality as compared to using NRS alone to determine the combined signal quality parameter.

As shown by reference number 740, the UE 710 may report the combined signal quality parameter to the base station 705. For example, the UE 710 may report the combined signal quality parameter as an RSRP value, an RSRQ value, and/or the like. In some aspects, the UE 710 may report the combined signal quality parameter to the base station 705 based at least in part on reporting that the UE 710 is capable of combining the signal and the NRS to determine the combined signal quality parameter. In some aspects, the UE 710 may report one or more measurement events to the base station 705 based at least in part on the combined signal quality parameter. The base station 705 may use the combined signal quality parameter in association with the one or more measurement events, such as to initiate a handover for the UE 710, to adjust a repetition level for the UE 710, to change a cell and/or a carrier for the UE 710, and/or the like. In this way, these network operations may be performed more effectively.

In some aspects, the UE 710 may report, to the base station 705, an indication of an accuracy of the combined signal quality parameter. The indication may indicate, for example, which signal types were used to generate the combined signal quality parameter (e.g., an NRS, a PSS, an SSS, a PBCH signal, a SIB, a PRS, a CRS, and/or the like), a number of signal types used to generate the combined signal quality parameter, a number of signals used to generate the combined signal quality parameter, a frequency diversity associated with signals used to generate the combined signal quality parameter, and/or the like. With respect to CRS, in some aspects, the indication may indicate which types of CRS were used to generate the combined signal quality parameter, such as a CRS limited to a bandwidth associated with an NB-IoT carrier (e.g., a narrowband CRS), a CRS outside of a bandwidth associated with an NB-IoT carrier (e.g., a wideband CRS), and/or the like.

As described above in connection with reference number 720, the UE 710 may report a capability of the UE 710 to use one or more of the above types of signals for measurements. For example, the UE 710 may report whether the UE 710 supports enhanced measurements (e.g., is capable of combining one or more signals described herein with an NRS for measurement reporting) or does not support enhanced measurements (e.g., is not capable of combining one or more signals described herein with an NRS for measurement reporting). In some aspects, the base station 705 may determine a threshold to be used by the UE 710 (e.g., a threshold for PRACH coverage level selection, a threshold for cell selection, a threshold for cell reselection, and/or the like) based at least in part on a capability of the UE 710 to use one or more of the above types of signals for measurements. For example, the base station 705 may broadcast a first threshold for UEs 710 that support enhanced measurements, and may broadcast a second threshold for UEs 710 that do not support enhanced measurements. In this way, one or more network operations (e.g., PRACH coverage level selection, cell selection, cell reselection, and/or the like) may be performed more effectively.

In some aspects, the UE 710 and/or the base station 705 may determine a repetition level for uplink communications based at least in part on the accuracy of the combined signal quality parameter. Additionally, or alternatively, the base station 705 may adjust transmissions to the UE 710, such as by determining a repetition level for downlink transmissions, based at least in part on the indication of the accuracy of the combined signal quality parameter. For example, if the combined signal quality parameter indicates a high signal quality with a low accuracy, the base station 705 may set a higher repetition level for downlink communications with the UE 710 than if the combined signal quality parameter indicates a high signal quality with a high accuracy (or no report of accuracy). Similarly, if the combined signal quality parameter indicates a low signal quality with a low accuracy, the base station 705 may set a lower repetition level for downlink communications with the UE 710 than if the combined signal quality parameter indicates a low signal quality with a high accuracy (or no report of accuracy). In this way, the base station 705 may increase a likelihood of signal reception by the UE 710 (e.g., when signal quality is low) while also conserving network resources and battery power of the UE (e.g., when signal quality is high).

While some aspects are described herein with respect to combining the signal (e.g., PSS, SSS, PBCH, CRS, and/or the like) with the NRS, in some aspects, the UE 710 may use only the signal (e.g., PSS, SSS, PBCH, CRS, and/or the like), and not the NRS, to report a signal quality parameter (e.g., rather than a combined signal quality parameter). In this case, the base station 705 may instruct the UE 710 regarding which signal(s) to be used to report the signal quality parameter, one or more additional parameters to be used to enable the UE 710 to use the signal(s) to report the signal quality parameter, and/or the like.

As indicated above, FIG. 7 is provided as an example. Other examples are possible and may differ from what was described with respect to FIG. 7.

Figure 8:
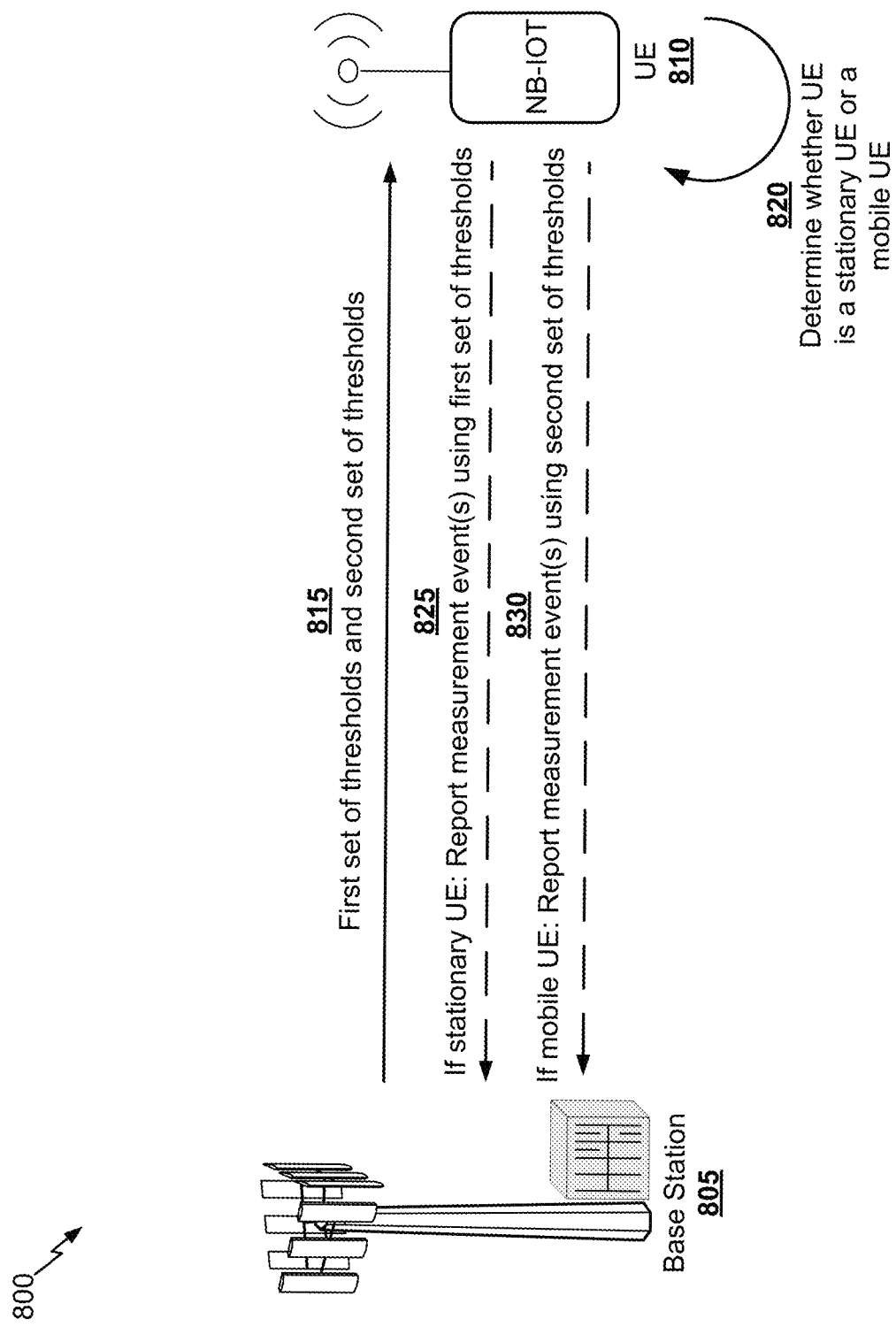

FIG. 8 is a diagram illustrating an example 800 of signal quality measurements for NB-IoT devices. As shown in FIG. 8, a base station 805 and a UE 810 may communicate with one another. The base station 805 may correspond to, for example, the base station 110 of FIG. 1, the base station 705 of FIG. 7, and/or the like. The UE 810 may correspond to, for example, the UE 120 of FIG. 1, the UE 710 of FIG. 7, and/or the like. In some aspects, the UE 810 may be an NB-IoT UE, an MTC UE, an eMTC UE, an LTE-M UE, an M2M UE, and/or the like. For example, the UE 810 may be an NB-IoT UE, as shown in FIG. 8.

As shown by reference number 815, the base station 805 may provide, to the UE 810, information that identifies a first set of thresholds (e.g., one or more first thresholds) and a second set of thresholds (e.g., one or more second thresholds) to be used for measurement reporting. In some aspects, the first set of thresholds may be used for stationary UEs and the second set of thresholds may be used for mobile UEs. In this case, the first set of thresholds may be more relaxed than the second set of thresholds. For example, a threshold may relate to a signal parameter measured by the UE 810 (e.g., SINR, RSRP, RSRQ, the combined signal quality parameter described in connection with FIG. 7, and/or the like), and the UE 810 may report neighbor cell measurements if a value of the signal parameter is below the threshold (e.g., in anticipation of a handover). In this case, the first threshold for stationary UEs may be lower than the second threshold for mobile UEs, thereby conserving battery power for stationary UEs by triggering neighbor cell measurements less often. Additionally, or alternatively, a threshold may relate to a reporting time requirement associated with the UE 810, as described below in connection with FIG. 9. In some aspects, a set of thresholds may include different thresholds, such as a threshold for cell search and/or reselection, a threshold for data communication, and/or the like.

In some aspects, the base station 805 may broadcast the first set of thresholds and/or the second set of thresholds. Additionally, or alternatively, the base station 805 may receive information that identifies whether the UE 810 is a stationary UE or a mobile UE, and may transmit one of the first set of thresholds or the second set of thresholds to the UE 810 based at least in part on whether the UE 810 is a stationary UE or a mobile UE. For example, the base station 805 may transmit the first set of thresholds to the UE 810 when the UE 810 is a stationary UE. Similarly, the base station 805 may transmit the second set of thresholds to the UE 810 when the UE 810 is a mobile UE.

As shown by reference number 820, the UE 810 may determine whether the UE 810 is a stationary UE or a mobile UE. In some aspects, the UE 810 may determine whether the UE 810 is a stationary UE or a mobile UE based at least in part on a preconfigured indication stored by the UE 810. For example, the UE 810 may store an indication in memory of whether the UE 810 is a stationary UE or a mobile UE. Additionally, or alternatively, the UE 810 may determine whether the UE 810 is a stationary UE or a mobile UE based at least in part on a Doppler estimation (e.g., to determine whether the UE 810 is moving, a speed at which the UE 810 is moving, and/or the like), a global positioning system (GPS) reading, an accelerometer reading, a gyroscope reading, and/or the like.

Additionally, or alternatively, the UE may determine whether the UE 810 is a stationary UE or a mobile UE based at least in part on a determination of a change in measurements on a serving cell over time. For example, if measurements on the serving cell do not vary appreciably over time (e.g., according to some measure of consistency over time, such as a variance, a standard deviation, the measurements remaining within a range, the measurements not varying by more than a threshold amount, and/or the like), then the UE 810 may determine that the UE 810 is a stationary UE. Otherwise, if measurements on the serving cell vary over time (e.g., according to some measure of consistency over time, such as a variance, a standard deviation, the measurements being outside a range, the measurements varying by more than a threshold amount, and/or the like), then the UE 810 may determine that the UE 810 is a mobile UE.

Additionally, or alternatively, the UE may determine whether the UE 810 is a stationary UE or a mobile UE based at least in part on a determination of a change in measurements on one or more neighbor cells over time (e.g., in a similar manner as described above in connection with a serving cell). In some aspects, the base station 805 (e.g. on the serving cell) may transmit a neighbor cell list to the UE 810 to identify neighbor cells (e.g., using neighbor cell identifiers). In some aspects, the neighbor cell list may indicate a location of a neighbor cell, a distance from the serving cell to the neighbor cell, a distance from the UE 810 to the neighbor cell, and/or the like. In this case, the UE 810 may select one or more neighbor cells to monitor for measurements based at least in part on the locations and/or distances of multiple neighbor cells. For example, the UE 810 may monitor only the closest neighbor cell to the UE 810, the closest and second closest neighbor cells to the UE 810, and/or the like. Additionally, or alternatively, the base station 805 may transmit different neighbor lists (e.g., that identify different combinations of neighbor cells) to different UEs 810 based at least in part on locations of the UEs 810, measurement reports received from the UEs 810 regarding the neighbor cells, and/or the like. In this way, the UE 810 may conserve battery power by monitoring only the neighbor cells with which the UE 810 is likely to have a strong connection, and by preventing monitoring with neighbor cells with which the UE 810 is likely to have a poor connection.

As shown by reference number 825, if the UE 810 is a stationary UE, then the UE 810 may report one or more measurement events using the first set of thresholds. Alternatively, as shown by reference number 830, if the UE 810 is a mobile UE, then the UE 810 may report one or more measurement events using the second set of thresholds. A measurement event may include, for example, an event triggered when a serving cell parameter (e.g., SINR, RSRP, RSRQ, and/or the like) is below a threshold, an event triggered when a neighbor cell parameter (e.g., on the same frequency as the serving cell) satisfies a threshold (e.g., is greater than the serving cell parameter), an event triggered when a parameter on a different frequency satisfies a threshold (e.g., is greater than a parameter on the current frequency), and/or the like. In some aspects, a measurement event may be associated with handover of the UE 810 to a different cell (e.g., an inter-frequency handover, an intra-frequency handover, and/or the like).

Additionally, or alternatively, the UE 810 may determine whether to use the first set of thresholds or the second set of thresholds for measurement reporting based at least in part on an indication of a sensitivity of an application, for which data is to be sent or received, to delay. For example, if the indication indicates that the application is tolerant of delay, then the UE 810 may use the first set of thresholds. Similarly, if the indication indicates that the application is sensitive to delay, then the UE 810 may use the second set of thresholds. In this way, battery power of the UE 810 may be conserved when applications are tolerant to delay, and data may be sent more quickly when applications are sensitive to delay.

Additionally, or alternatively, the UE 810 may determine whether to use the first set of thresholds or the second set of thresholds for measurement reporting based at least in part on a frequency with which the UE 810 transmits and/or receives data. For example, if the UE 810 transmits and/or receives data infrequently (e.g., at less than a threshold rate), then the UE 810 may use the first set of thresholds. Similarly, if the UE 810 transmits and/or receives data frequently (e.g., at greater than a threshold rate), then the UE 810 may use the second set of thresholds. In this way, battery power of UEs 810 that communicate infrequently may be conserved, and delay may be reduced for UEs 810 that communicate frequently.

As indicated above, FIG. 8 is provided as an example. Other examples are possible and may differ from what was described with respect to FIG. 8.

Figure 9:
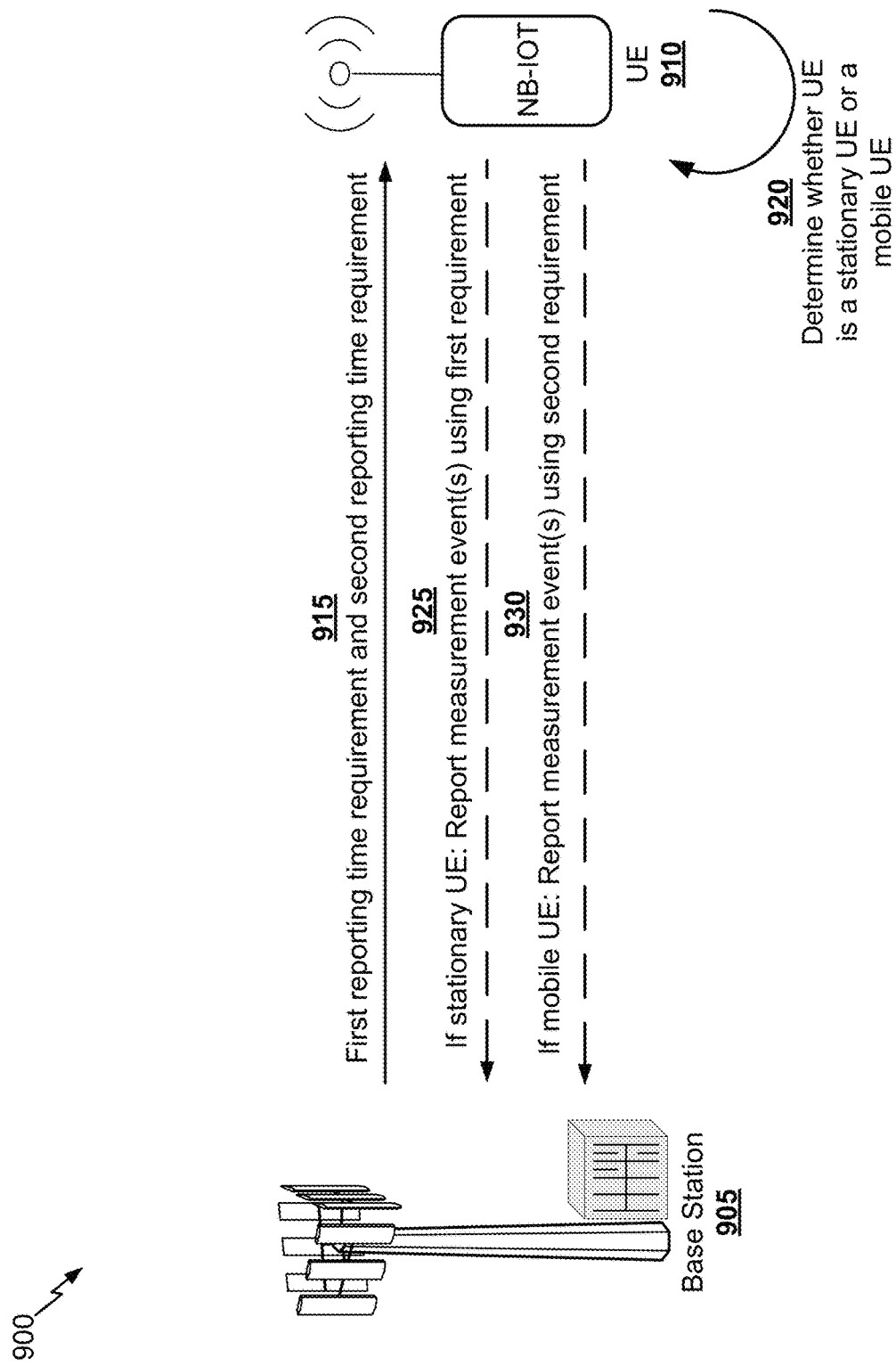

FIG. 9 is a diagram illustrating an example 900 of signal quality measurements for NB-IoT devices. As shown in FIG. 9, a base station 905 and a UE 910 may communicate with one another. The base station 905 may correspond to, for example, the base station 110 of FIG. 1, the base station 705 of FIG. 7, the base station 805 of FIG. 8, and/or the like. The UE 910 may correspond to, for example, the UE 120 of FIG. 1, the UE 710 of FIG. 7, the UE 810 of FIG. 8, and/or the like. In some aspects, the UE 910 may be an NB-IoT UE, an MTC UE, an eMTC UE, an LTE-M UE, an M2M UE, and/or the like. For example, the UE 910 may be an NB-IoT UE, as shown in FIG. 9.

As shown by reference number 915, the base station 905 may provide, to the UE 910, information that identifies a first reporting time requirement and a second reporting time requirement to be used for measurement reporting. In some aspects, the first reporting time requirement may be used for stationary UEs and the second reporting time requirement may be used for mobile UEs. A reporting time requirement may indicate an amount of time between when the UE 910 receives a request for a measurement report and when the UE 910 provides the measurement report. In some aspects, the first reporting time requirement may be a longer amount of time than the second reporting time requirement because stationary UEs may be more tolerant of delay than mobile UEs.

As shown by reference number 920, the UE 910 may determine whether the UE 910 is a stationary UE or a mobile UE, as described above in connection with FIG. 8.

As shown by reference number 925, if the UE 910 is a stationary UE, then the UE 910 may report one or more measurement events using the first reporting time requirement. For example, the UE 910 may report the measurement event(s) and/or one or more signal parameters within a first threshold time period indicated by the first reporting time requirement. Alternatively, as shown by reference number 930, if the UE 910 is a mobile UE, then the UE 910 may report one or more measurement events using the second reporting time requirement. For example, the UE 910 may report the measurement event(s) and/or one or more signal parameters within a second threshold time period indicated by the second reporting time requirement. In this way, UEs that are more sensitive to delay, such as mobile UEs, may report measurement events more quickly, and UEs that are less sensitive to delay may report measurement events more slowly.

In some aspects, the time period of the delay for reporting measurement events for stationary UEs may be used to obtain more accurate measurements, such as by using one or more techniques described above in connection with FIG. 7. For example, the UE 910 may determine signal quality parameter(s) using NRS when the UE 910 does not have data to send and/or receive, and may trigger a determination of the combined signal quality parameter using NRS and one or more other signals when the UE 910 has data to send and/or receive. The UE 910 may use the additional amount of time associated with the second reporting time requirement (e.g., as compared to the first reporting time requirement) to monitor the other signal(s) and determine the combined signal quality parameter for more accurate measurements. For example, the UE 910 may receive a page from the base station 905 on a first cell (e.g., with a lower signal quality), which may trigger the UE 910 to obtain more accurate measurements and to report these measurements to the base station 905 to potentially connect to a second cell (e.g., with a higher signal quality) to receive the data associated with the page. The UE 910 may obtain more accurate measurements in a similar manner when the UE 910 has data to transmit, is to perform cell search and/or reselection, and/or the like. In this way, battery power of the UE 910 may be conserved until the UE 910 needs accurate measurements.

As indicated above, FIG. 9 is provided as an example. Other examples are possible and may differ from what was described with respect to FIG. 9.

Figure 10:
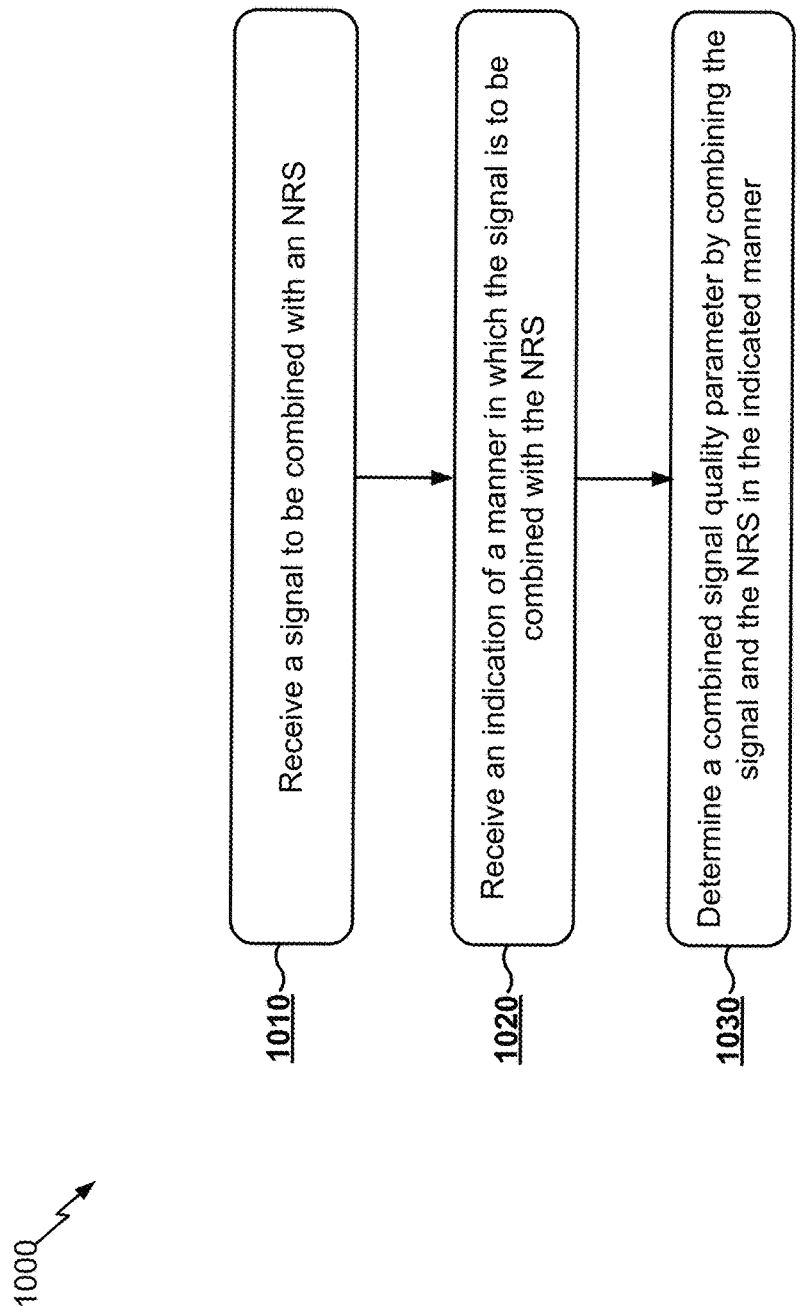
FIGS. 10-13 are flow charts of methods of wireless communication.

FIG. 10 is a flow chart of a method 1000 of wireless communication. The method may be performed by a UE (e.g., the UE 120 of FIG. 1, the UE 710 of FIG. 7, the UE 810 of FIG. 8, the UE 910 of FIG. 9, the apparatus 1402/1402' of FIGS. 14 and/or 15, and/or the like).

At 1010, the UE may receive a signal to be combined with an NRS. For example, the UE may receive a signal to be combined with a narrowband reference signal to determine a combined signal quality parameter, as described above in connection with FIG. 7. In some aspects, the signal is not a narrowband reference signal. In some aspects, the signal includes at least one of: a primary synchronization signal, a secondary synchronization signal, a physical broadcast channel signal, a system information block, a positioning reference signal, a cell-specific reference signal, or some combination thereof. In some aspects, the signal occurs periodically on one or more subframes. In some aspects, the signal is one of a plurality of signals received on a plurality of carriers.

In some aspects, the signal includes a cell-specific reference signal (CRS). In some aspects, the CRS is limited to a bandwidth associated with a narrowband Internet of Things (NB-IoT) carrier. In some aspects, the CRS includes CRS outside of a bandwidth associated with a narrowband Internet of Things (NB-IoT) carrier. In some aspects, the indication indicates at least one of: a relative traffic-to-pilot ratio of the CRS as compared to the narrowband reference signal, a cell identifier associated with the CRS, one or more parameters to be used to determine a scrambling code of the CRS in a narrowband Internet of Things (NB-IoT) carrier, information to be used to decode the CRS, or some combination thereof.

In some aspects, the UE may receive the narrowband reference signal, wherein the narrowband reference signal is signaled in one or more of a first three orthogonal frequency division multiplexing (OFDM) symbols of a subframe. In some aspects, the narrowband reference signal is signaled in an unused primary synchronization signal tone. In some aspects, the narrowband reference signal is one of a plurality of narrowband reference signals received on a plurality of carriers.

In some aspects, the signal is used to determine the combined signal quality parameter for serving cell measurements and not for neighbor cell measurements. In some aspects, one or more reserved bits of the signal are determined based at least in part on a previously decoded signal At 1020, the UE may receive an indication of a manner in which the signal is to be combined with the NRS. For example, the UE may receive an indication of a manner in which the signal is to be combined with the narrowband reference signal to determine the combined signal quality parameter, as described above in connection with FIG. 7. In some aspects, the indication indicates at least one of: whether to combine the signal with the narrowband reference signal, a power level of the signal relative to the narrowband reference signal, a traffic-to-pilot ratio of the signal, a weight to be applied to the signal and/or the narrowband reference signal when determining the combined signal quality parameter, a degree to which the signal is similar to a corresponding signal on a neighbor cell, or some combination thereof.

At 1030, the UE may determine a combined signal quality parameter by combining the signal and the NRS in the indicated manner. For example, the UE may determine the combined signal quality parameter based at least in part on combining the signal and the narrowband reference signal in the indicated manner, as described above in connection with FIG. 7. In some aspects, the UE may report the combined signal quality parameter to a base station. In some aspects, the combined signal quality parameter is reported to the base station as at least one of: a reference signal received power (RSRP) value, or a reference signal received quality (RSRQ) value.

In some aspects, the UE may report an indication of an accuracy of the combined signal quality parameter. In some aspects, a repetition level for the UE may be determined based at least in part on the accuracy of the combined signal quality parameter.

In some aspects, the UE may receive information that identifies a first set of thresholds and a second set of thresholds to be used for measurement reporting, wherein the first set of thresholds is used for stationary UEs and the second set of thresholds is used for mobile UEs. The UE may determine whether the UE is a stationary UE or a mobile UE. The UE may report one or more measurement events using either the first set of thresholds or the second set of thresholds based at least in part on determining whether the UE is a stationary UE or a mobile UE and based at least in part on the combined signal quality parameter.

Although FIG. 10 shows example blocks of a method of wireless communication, in some aspects, the method may include additional blocks, fewer blocks, different blocks, or differently arranged blocks than those shown in FIG. 10. Additionally, or alternatively, two or more blocks shown in FIG. 10 may be performed in parallel.

Figure 11:
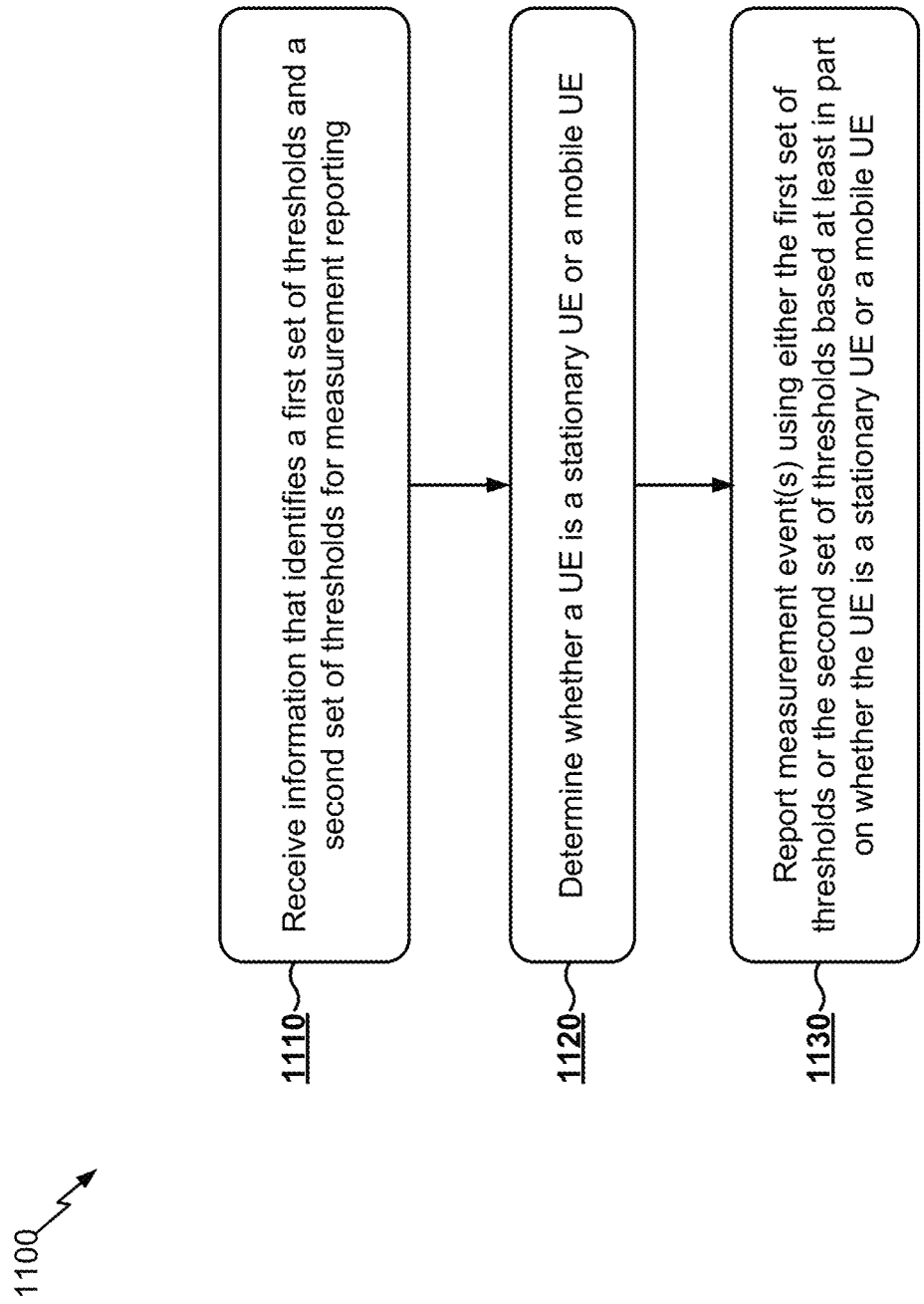

FIG. 11 is a flow chart of a method 1100 of wireless communication. The method may be performed by a UE (e.g., the UE 120 of FIG. 1, the UE 710 of FIG. 7, the UE 810 of FIG. 8, the UE 910 of FIG. 9, the apparatus 1402/1402' of FIGS. 14 and/or 15, and/or the like).

At 1110, the UE may receive information that identifies a first set of thresholds and a second set of thresholds for measurement reporting. For example, the UE may receive information that identifies a first set of thresholds and a second set of thresholds to be used for measurement reporting, as described above in connection with FIG. 8. In some aspects, the first set of thresholds may be used for stationary UEs and the second set of thresholds may be used for mobile UEs. In some aspects, the first set of thresholds (or the second set of thresholds) includes different thresholds for cell reselection and data communication.

At 1120, the UE may determine whether the UE is a stationary UE or a mobile UE. For example, the UE may determine whether the UE is a stationary UE or a mobile UE, as described above in connection with FIG. 8. In some aspects, the determination of whether the UE is a stationary UE or a mobile UE is based at least in part on at least one of: a preconfigured indication stored by the UE, a determination of a change in measurements on a serving cell over time, a determination of a change in measurements on one or more neighbor cells over time, a Doppler estimation, or some combination thereof.

At 1130, the UE may report one or more measurement events using either the first set of thresholds or the second set of thresholds based at least in part on whether the UE is a stationary UE or a mobile UE. For example, the UE may report one or more measurement events to a base station using either the first set of thresholds or the second set of thresholds based at least in part on determining whether the UE is a stationary UE or a mobile UE, as described above in connection with FIG. 8. In some aspects, the one or more measurement events are reported based at least in part on a determination that the UE has data to transmit or receive.

In some aspects, the UE is configured to report the one or more measurement events based at least in part on a first reporting time requirement or a second reporting time requirement, wherein the first reporting time requirement is used for stationary UEs and the second reporting time requirement is used for mobile UEs.

In some aspects, the UE may receive a signal to be combined with a narrowband reference signal to determine a combined signal quality parameter, wherein the signal is not a narrowband reference signal. The UE may receive an indication of a manner in which the signal is to be combined with the narrowband reference signal to determine the combined signal quality parameter. The UE may determine the combined signal quality parameter based at least in part on combining the signal and the narrowband reference signal in the indicated manner. The UE may report the one or more measurement events based at least in part on the combined signal quality parameter.

Although FIG. 11 shows example blocks of a method of wireless communication, in some aspects, the method may include additional blocks, fewer blocks, different blocks, or differently arranged blocks than those shown in FIG. 11. Additionally, or alternatively, two or more blocks shown in FIG. 11 may be performed in parallel.

Figure 12:
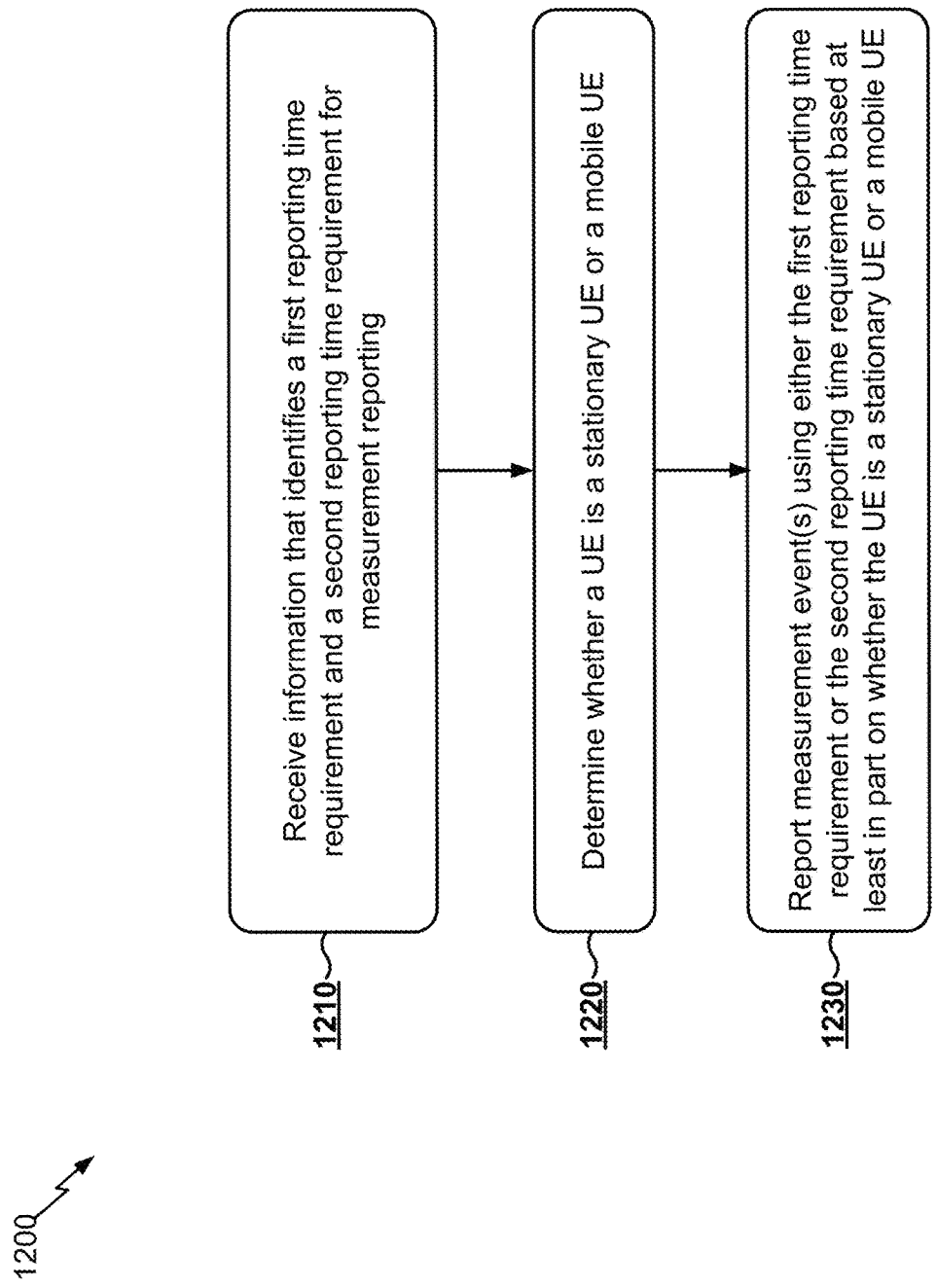

FIG. 12 is a flow chart of a method 1200 of wireless communication. The method may be performed by a UE (e.g., the UE 120 of FIG. 1, the UE 710 of FIG. 7, the UE 810 of FIG. 8, the UE 910 of FIG. 9, the apparatus 1402/1402' of FIGS. 14 and/or 15, and/or the like).

At 1210, the UE may receive information that identifies a first reporting time requirement and a second reporting time requirement for measurement reporting. For example, the UE may receive information that identifies a first reporting time requirement and a second reporting time requirement to be used for measurement reporting, as described above in connection with FIG. 9. In some aspects, the first reporting time requirement may be used for stationary UEs and the second reporting time requirement may be used for mobile UEs. In some aspects, the first reporting time requirement (or the second reporting time requirement) includes different reporting time requirements for cell reselection and data communication.

At 1220, the UE may determine whether a UE is a stationary UE or a mobile UE. For example, the UE may determine whether the UE is a stationary UE or a mobile UE, as described above in connection with FIG. 8. In some aspects, the determination of whether the UE is a stationary UE or a mobile UE is based at least in part on at least one of: a preconfigured indication stored by the UE, a determination of a change in measurements on a serving cell over time, a determination of a change in measurements on one or more neighbor cells over time, a Doppler estimation, or some combination thereof.

At 1230, the UE may report one or more measurement events using either the first reporting time requirement or the second reporting time requirement based at least in part on whether the UE is a stationary UE or a mobile UE. For example, the UE may report one or more measurement events to a base station using either the first reporting time requirement or the second reporting time requirement based at least in part on determining whether the UE is a stationary UE or a mobile UE, as described above in connection with FIG. 9. In some aspects, the one or more measurement events are reported based at least in part on a determination that the UE has data to transmit or receive.

In some aspects, the UE is configured to report the one or more measurement events based at least in part on a first set of thresholds or a second set of thresholds, wherein the first set of thresholds is used for stationary UEs and the second set of thresholds is used for mobile UEs.

In some aspects, the UE may receive a signal to be combined with a narrowband reference signal to determine a combined signal quality parameter, wherein the signal is not a narrowband reference signal. The UE may receive an indication of a manner in which the signal is to be combined with the narrowband reference signal to determine the combined signal quality parameter. The UE may determine the combined signal quality parameter based at least in part on combining the signal and the narrowband reference signal in the indicated manner. The UE may report the one or more measurement events based at least in part on the combined signal quality parameter.

Although FIG. 12 shows example blocks of a method of wireless communication, in some aspects, the method may include additional blocks, fewer blocks, different blocks, or differently arranged blocks than those shown in FIG. 12. Additionally, or alternatively, two or more blocks shown in FIG. 12 may be performed in parallel.

Figure 13:
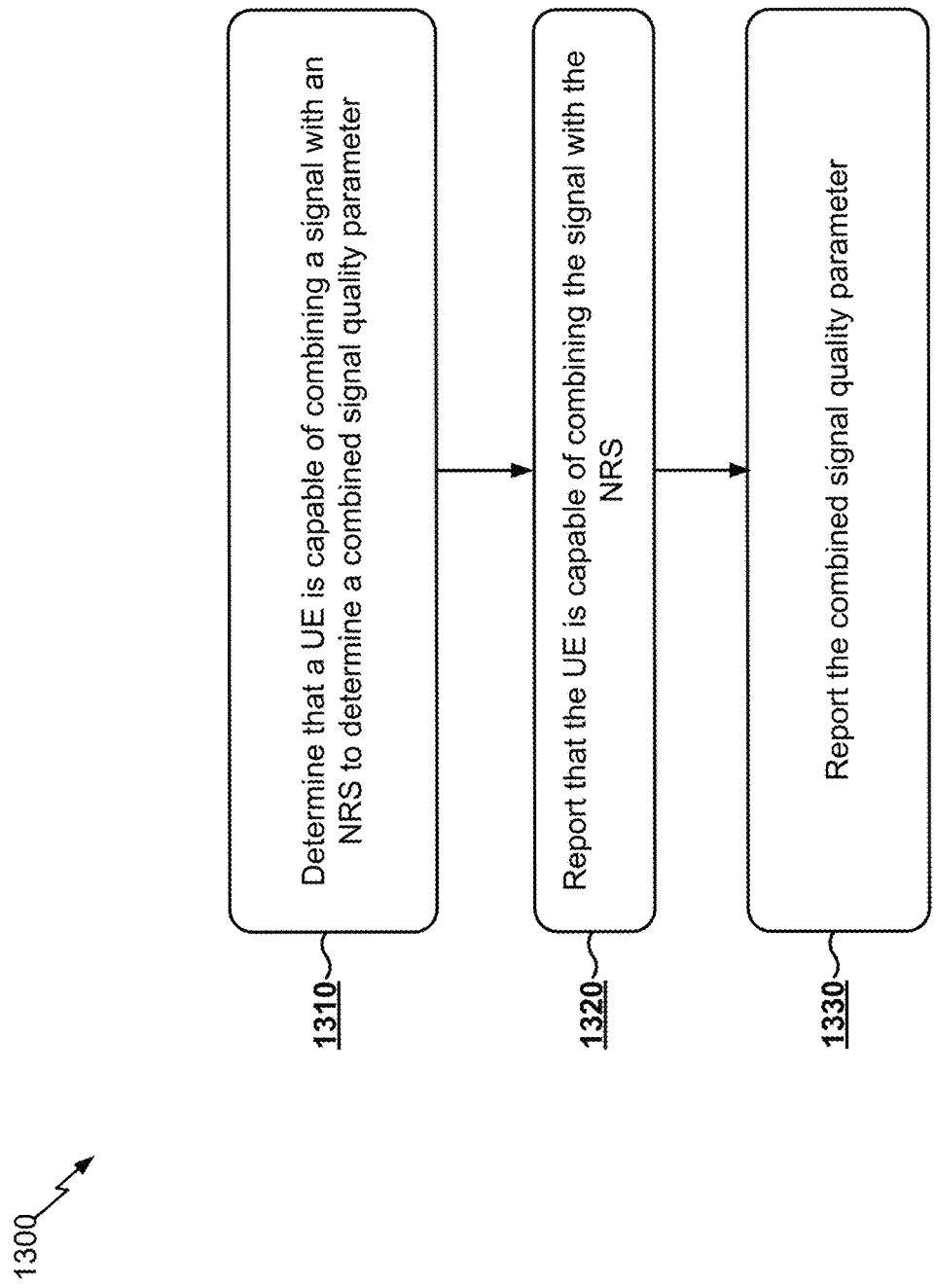

FIG. 13 is a flow chart of a method 1300 of wireless communication. The method may be performed by a UE (e.g., the UE 120 of FIG. 1, the UE 710 of FIG. 7, the UE 810 of FIG. 8, the UE 910 of FIG. 9, the apparatus 1402/1402' of FIGS. 14 and/or 15, and/or the like).

At 1310, the UE may determine that the UE is capable of combining a signal with an NRS to determine a combined signal quality parameter. For example, the UE may determine whether the UE is capable of combining a signal with an NRS, as described above in connection with FIG. 7. In some aspects, the signal is not an NRS.

At 1320, the UE may report that the UE is capable of combining the signal with the NRS. For example, the UE may report that the UE is capable of combining the signal with the NRS, as described above on connection with FIG. 7

At 1330, the UE may report the combined signal quality parameter. For example, the UE may report the combined signal quality parameter to a base station based at least in part on reporting that the UE is capable of combining the signal with the NRS, as described above in connection with FIG. 7.

In some aspects, the signal includes at least one of: a primary synchronization signal, a secondary synchronization signal, a physical broadcast channel signal, a system information block, a positioning reference signal, a cell-specific reference signal, or some combination thereof.

In some aspects, the UE is configured to use a first threshold for physical random access channel (PRACH) coverage level selection based at least in part on the capability of the UE to combine the signal with the narrowband reference signal, wherein the first threshold is different from a second threshold associated with UEs that are not capable of combining the signal with the narrowband reference signal. In some aspects, the UE is configured to use a first threshold for cell selection based at least in part on the capability of the UE to combine the signal with the narrowband reference signal, wherein the first threshold is different from a second threshold associated with UEs that are not capable of combining the signal with the narrowband reference signal.

In some aspects, the UE may report an indication of an accuracy of the combined signal quality parameter. In some aspects, the indication identifies at least one of: one or more signal types used to generate the combined signal quality parameter, a number of signal types used to generate the combined signal quality parameter, a number of signals used to generate the combined signal quality parameter, a frequency diversity associated with signals used to generate the combined signal quality parameter, or some combination thereof. In some aspects, the signal includes a cell-specific reference signal (CRS), and wherein the indication identifies a type of CRS used to generate the combined signal quality parameter, wherein the type includes at least one of a narrowband CRS or a wideband CRS. In some aspects, the UE may determine a repetition level for the UE based at least in part on the accuracy of the combined signal quality parameter.

Although FIG. 13 shows example blocks of a method of wireless communication, in some aspects, the method may include additional blocks, fewer blocks, different blocks, or differently arranged blocks than those shown in FIG. 13. Additionally, or alternatively, two or more blocks shown in FIG. 13 may be performed in parallel.

Figure 14:
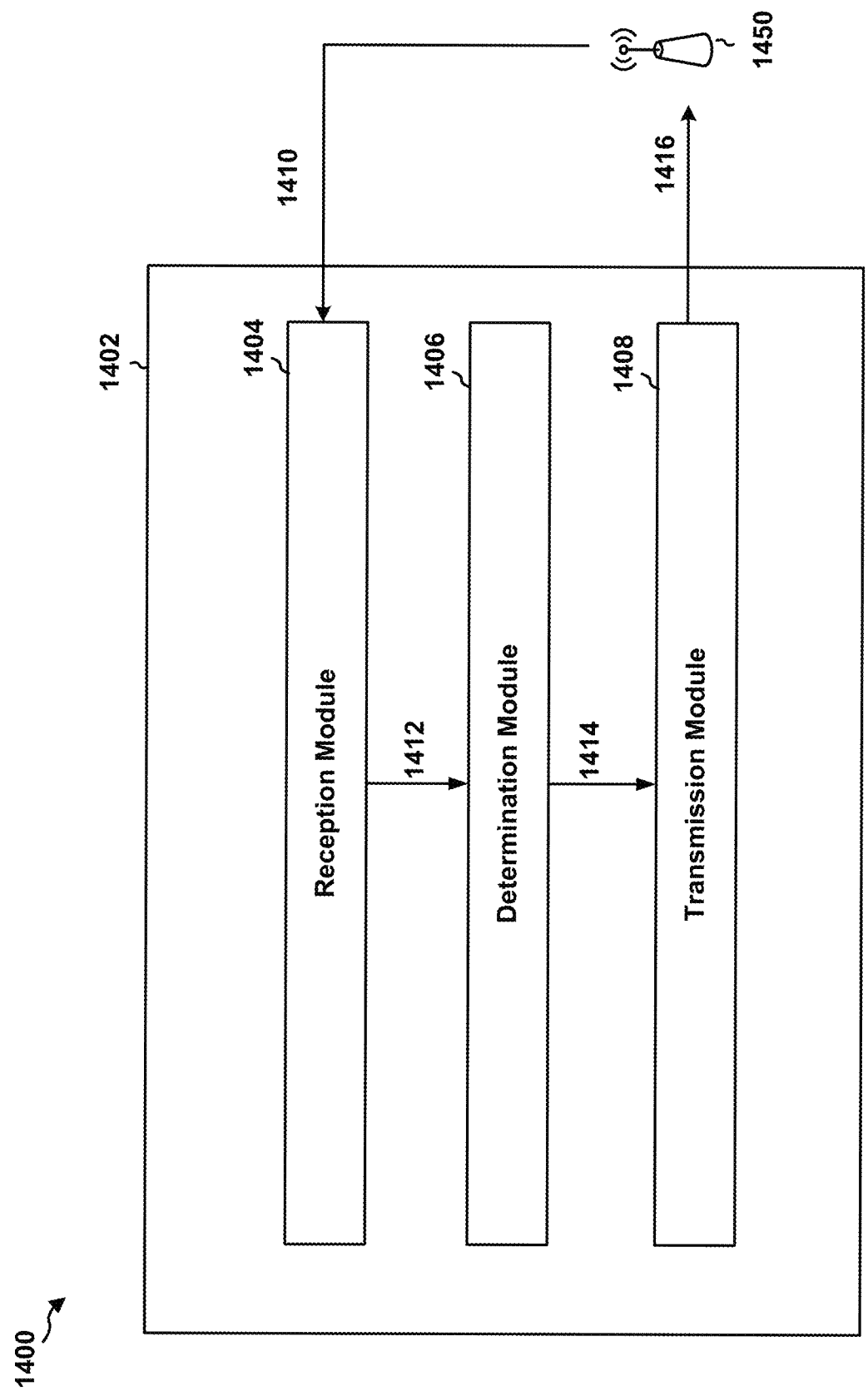
FIG. 14 is a conceptual data flow diagram illustrating the data flow between different modules/means/components in an example apparatus.

FIG. 14 is a conceptual data flow diagram 1400 illustrating the data flow between different modules/means/components in an example apparatus 1402. The apparatus 1402 may be a UE. In some aspects, the apparatus 1402 includes a reception module 1404, a determination module 1406, a transmission module 1408, and/or the like.

In some aspects, the reception module 1404 may receive, from a base station 1450 as data 1410, an NRS, a signal to be combined with the NRS, and/or an indication of a manner in which the signal is to be combined with the NRS. The reception module 1404 may provide this information to the determination module 1406 as data 1412. The determination module 1406 may determine a combined signal quality parameter based at least in part on combining the signal and the NRS in the indicated manner. The determination modules 1406 may provide the combined signal quality parameter to the transmission module 1408 as data 1414. The transmission module 1408 may transmit (e.g., report) the combined signal quality parameter to the base station 1450 as data 1416. Additionally, or alternatively, the transmission module 1408 may transmit an indication of an accuracy of the combined signal quality parameter.

In some aspects, the reception module 1404 may receive, from the base station 1450 as data 1410, information that identifies a first set of thresholds and a second set of thresholds to be used for measurement reporting. The reception module 1404 may provide this information to the determination module 1406 as data 1412 and/or the transmission module 1408 as data 1414. The determination module 1406 may determine whether the apparatus 1402 is a stationary apparatus or a mobile apparatus, and may provide an indication of the determination to the transmission module 1408 as data 1414. The transmission module 1408 may transmit (e.g., report) one or more measurement events, as data 1416, to the base station 1450 using either the first set of thresholds or the second set of thresholds based at least in part on the determination.

In some aspects, the reception module 1404 may receive, from the base station 1450 as data 1410, information that identifies a first reporting time requirement and a second reporting time requirement to be used for measurement reporting. The reception module 1404 may provide this information to the determination module 1406 as data 1412 and/or the transmission module 1408 as data 1414. The determination module 1406 may determine whether the apparatus 1402 is a stationary apparatus or a mobile apparatus, and may provide an indication of the determination to the transmission module 1408 as data 1414. The transmission module 1408 may transmit (e.g., report) one or more measurement events, as data 1416, to the base station 1450 using either the first reporting time requirement or the second reporting time requirement based at least in part on the determination.

In some aspects, the determination module 1406 may determine whether the apparatus 1402 is capable of combining a signal with an NRS to determine a combined signal quality parameter. The determination module 1406 may indicate, to the transmission module 1408 as data 1414, whether the apparatus 1402 is capable of combining a signal with an NRS to determine a combined signal quality parameter. The transmission module 1408 may transmit (e.g., report), as data 1416 to the base station 1450, whether the apparatus 1402 is capable of combining the signal with the NRS. Additionally, or alternatively, the transmission module 1408 may transmit (e.g., report), as data 1416 to the base station 1450, the combined signal quality parameter, in a similar manner as described above.

The apparatus may include additional modules that perform each of the blocks of the algorithm in the aforementioned flow charts of FIGS. 10, 11, 12, and/or 13. As such, each block in the aforementioned flow charts of FIGS. 10, 11, 12, and/or 13 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 14 are provided as an example. In practice, there may be additional modules, fewer modules, different modules, or differently arranged modules than those shown in FIG. 14. Furthermore, two or more modules shown in FIG. 14 may be implemented within a single module, or a single module shown in FIG. 14 may be implemented as multiple, distributed modules. Additionally, or alternatively, a set of modules (e.g., one or more modules) shown in FIG. 14 may perform one or more functions described as being performed by another set of modules shown in FIG. 14.

Figure 15:
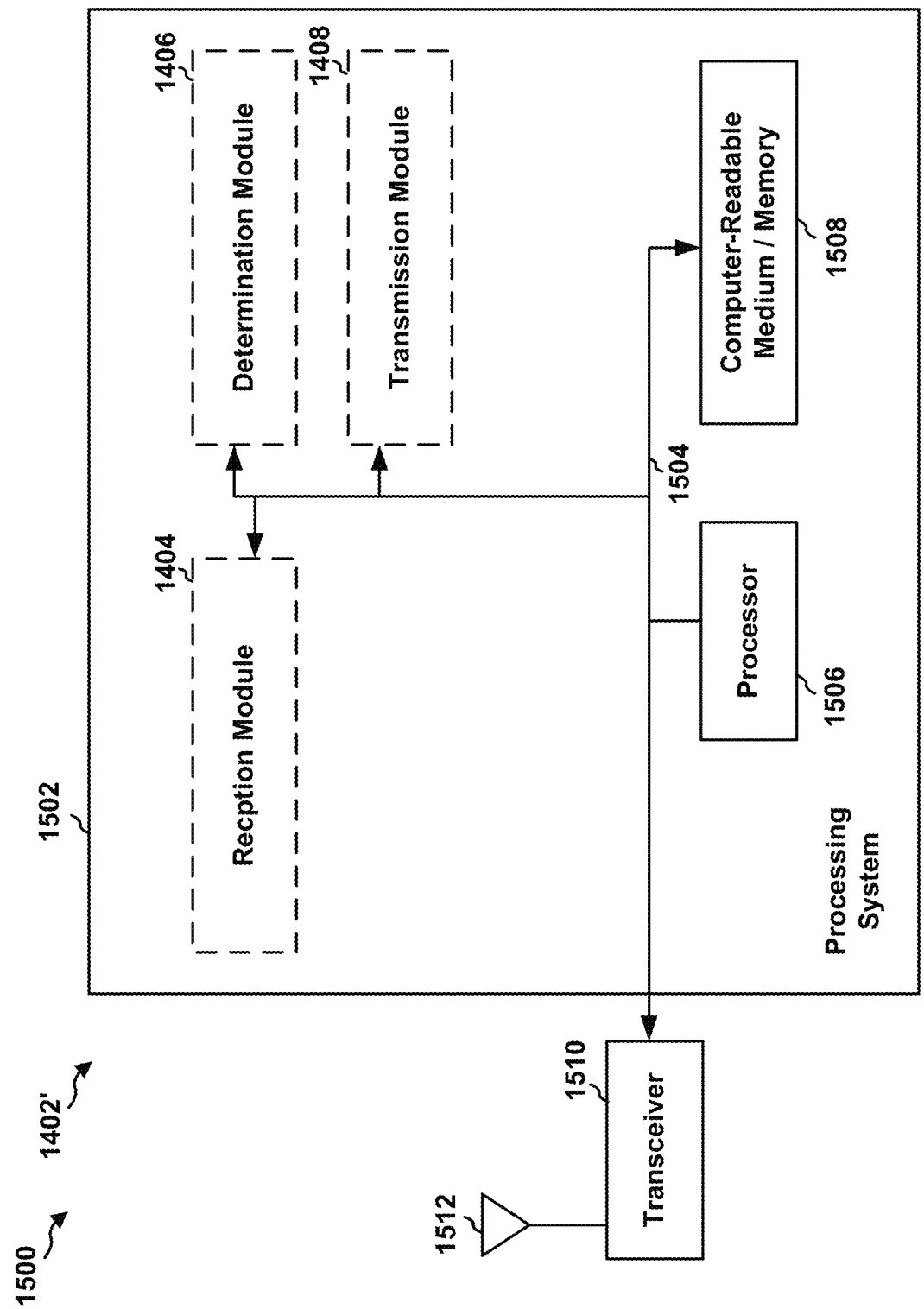
FIG. 15 is a diagram illustrating an example of a hardware implementation for an apparatus employing a processing system.

FIG. 15 is a diagram 1500 illustrating an example of a hardware implementation for an apparatus 1402' employing a processing system 1502. The apparatus 1402' may be a UE.

The processing system 1502 may be implemented with a bus architecture, represented generally by the bus 1504. The bus 1504 may include any number of interconnecting buses and bridges depending on the specific application of the processing system 1502 and the overall design constraints. The bus 1504 links together various circuits including one or more processors and/or hardware modules, represented by the processor 1506, the modules 1404, 1406, and/or 1408, and the computer-readable medium/memory 1508. The bus 1504 may also link various other circuits such as timing sources, peripherals, voltage regulators, and power management circuits, which are well known in the art, and therefore, will not be described any further.

The processing system 1502 may be coupled to a transceiver 1510. The transceiver 1510 is coupled to one or more antennas 1512. The transceiver 1510 provides a means for communicating with various other apparatus over a transmission medium. The transceiver 1510 receives a signal from the one or more antennas 1512, extracts information from the received signal, and provides the extracted information to the processing system 1502, specifically the reception module 1404. In addition, the transceiver 1510 receives information from the processing system 1502, specifically the transmission module 1408, and based at least in part on the received information, generates a signal to be applied to the one or more antennas 1512. The processing system 1502 includes a processor 1506 coupled to a computer-readable medium/memory 1508. The processor 1506 is responsible for general processing, including the execution of software stored on the computer-readable medium/memory 1508. The software, when executed by the processor 1506, causes the processing system 1502 to perform the various functions described supra for any particular apparatus. The computer-readable medium/memory 1508 may also be used for storing data that is manipulated by the processor 1506 when executing software. The processing system further includes at least one of the modules 1404, 1406, and/or 1408. The modules may be software modules running in the processor 1506, resident/stored in the computer readable medium/memory 1508, one or more hardware modules coupled to the processor 1506, or some combination thereof. The processing system 1502 may be a component of the UE 120 and may include the memory 282 and/or at least one of the TX MIMO processor 266, the RX processor 258, and/or the controller/processor 280.

In some aspects, the apparatus 1402/1402' for wireless communication includes means for receiving a signal to be combined with an NRS, means for receiving an indication of a manner in which the signal is to be combined with the NRS, means for determining a combined signal quality parameter, means for receiving the NRS, means for reporting the combined signal quality parameter, means for reporting an indication of an accuracy of the combined signal quality parameter, means for receiving information that identifies a first set of thresholds and a second set of thresholds to be used for measurement reporting, means for receiving information that identifies a first reporting time requirement and a second reporting time requirement to be used for measurement reporting, means for determining whether the apparatus is a stationary apparatus or a mobile apparatus, means for reporting one or more measurement events, and/or the like. Additionally, or alternatively, the apparatus 1402/1402' for wireless communication includes means for determining that the apparatus is capable of combining a signal with a narrowband reference signal to determine a combined signal quality parameter, means for reporting that the apparatus is capable of combining the signal with the narrowband reference signal, means for reporting the combined signal quality parameter, and/or the like. The aforementioned means may be one or more of the aforementioned modules of the apparatus 1402 and/or the processing system 1502 of the apparatus 1402' configured to perform the functions recited by the aforementioned means. As described supra, the processing system 1502 may include the TX MIMO processor 266, the RX processor 258, and/or the controller/processor 280. As such, in one configuration, the aforementioned means may be the TX MIMO processor 266, the RX processor 258, and/or the controller/processor 280 configured to perform the functions recited by the aforementioned means.

FIG. 15 is provided as an example. Other examples are possible and may differ from what was described in connection with FIG. 15.

It is understood that the specific order or hierarchy of blocks in the processes/flow charts disclosed is an illustration of example approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
   receiving, by a user equipment (UE), a signal to be combined with a narrowband reference signal to determine a combined signal quality parameter, wherein the signal is not a narrowband reference signal;
   receiving, by the UE, an indication of a manner in which the signal is to be combined with the narrowband reference signal to determine the combined signal quality parameter, wherein the indication indicates a power level of the signal relative to the narrowband reference signal, and wherein the narrowband reference signal includes multiple narrowband reference signals; and determining, by the UE and in the indicated manner, the combined signal quality parameter using a linear average based at least in part on the signal, as adjusted based on the power level, and the multiple narrowband reference signals.

2. The method of claim 1, wherein the signal includes at least one of:
a primary synchronization signal,
a physical broadcast channel signal,
a system information block,
a positioning reference signal,
a cell-specific reference signal, or
some combination thereof.

3. The method of claim 1, wherein the indication further indicates a weight to be applied to the signal and/or the narrowband reference signal when determining the combined signal quality parameter.

4. The method of claim 1, wherein the signal occurs periodically on one or more subframes.

5. The method of claim 1, wherein the signal includes a cell-specific reference signal (CRS).

6. The method of claim 5, wherein the CRS is limited to a bandwidth associated with a narrowband Internet of Things (NB-IoT) carrier.

7. The method of claim 5, wherein the CRS includes CRS outside of a bandwidth associated with a narrowband Internet of Things (NB-IoT) carrier.

8. The method of claim 5, wherein the indication further indicates at least one of:
a relative traffic-to-pilot ratio of the CRS as compared to the narrowband reference signal,
a cell identifier associated with the CRS,
one or more parameters to be used to determine a scrambling code of the CRS in a narrowband Internet of Things (NB-IoT) carrier,
information to be used to decode the CRS, or
some combination thereof.

9. The method of claim 1, further comprising receiving the narrowband reference signal, wherein the narrowband reference signal is signaled in one or more of a first three orthogonal frequency division multiplexing (OFDM) symbols of a subframe.

10. The method of claim 1, further comprising receiving the narrowband reference signal, wherein the narrowband reference signal is signaled in an unused primary synchronization signal tone.

11. The method of claim 1, wherein the signal is one of a plurality of signals received on a plurality of carriers.

12. The method of claim 1, further comprising reporting the combined signal quality parameter to a base station.

13. The method of claim 12, wherein the combined signal quality parameter is reported to the base station as at least one of:
a reference signal received power (RSRP) value, or
a reference signal received quality (RSRQ) value.

14. The method of claim 1, wherein the signal is used to determine the combined signal quality parameter for serving cell measurements and not for neighbor cell measurements.

15. The method of claim 1, wherein one or more reserved bits of the signal are determined based at least in part on a previously decoded signal.

16. The method of claim 1, wherein the multiple narrowband reference signals are received over multiple subframes.

17. A user equipment (UE) for wireless communication, comprising:
memory; and
one or more processors coupled to the memory, the memory and the one or more processors configured to:
receive a signal to be combined with a narrowband reference signal to determine a combined signal quality parameter, wherein the signal is not a narrowband reference signal;
receive an indication of a manner in which the signal is to be combined with the narrowband reference signal to determine the combined signal quality parameter, wherein the indication indicates a power level of the signal relative to the narrowband reference signal, and wherein the narrowband reference signal includes multiple narrowband reference signals; and
determine, in the indicated manner, the combined signal quality parameter using a linear average based at least in part on the signal, as adjusted based on the power level, and the multiple narrowband reference signals.

18. The UE of claim 17, wherein the signal includes at least one of:
a primary synchronization signal,
a secondary synchronization signal,
a physical broadcast channel signal,
a system information block,
a positioning reference signal,
a cell-specific reference signal, or
some combination thereof.

19. The UE of claim 17, wherein the indication further indicates a weight to be applied to the signal and/or the narrowband reference signal when determining the combined signal quality parameter.

20. The UE of claim 17, wherein the signal occurs periodically on one or more subframes.

21. The UE of claim 17, wherein the signal includes a cell-specific reference signal (CRS).

22. The UE of claim 21, wherein the CRS is limited to a bandwidth associated with a narrowband Internet of Things (NB-IoT) carrier.

23. The UE of claim 21, wherein the CRS includes CRS outside of a bandwidth associated with a narrowband Internet of Things (NB-IoT) carrier.

24. The UE of claim 21, wherein the indication further indicates at least one of:
a relative traffic-to-pilot ratio of the CRS as compared to the narrowband reference signal,
a cell identifier associated with the CRS,
one or more parameters to be used to determine a scrambling code of the CRS in a narrowband Internet of Things (NB-IoT) carrier,
information to be used to decode the CRS, or
some combination thereof.

25. The UE of claim 17, further comprising receiving the narrowband reference signal, wherein the narrowband reference signal is signaled in one or more of a first three orthogonal frequency division multiplexing (OFDM) symbols of a subframe.

26. The UE of claim 17, further comprising receiving the narrowband reference signal, wherein the narrowband reference signal is signaled in an unused primary synchronization signal tone.

27. The UE of claim 17, wherein the signal is one of a plurality of signals received on a plurality of carriers.

28. The UE of claim 17, further comprising reporting the combined signal quality parameter to a base station.

29. The UE of claim 28, wherein the combined signal quality parameter is reported to the base station as at least one of:
   a reference signal received power (RSRP) value, or
   a reference signal received quality (RSRQ) value.

30. An apparatus for wireless communication, comprising:
   means for receiving a signal to be combined with a narrowband reference signal to determine a combined signal quality parameter, wherein the signal is not a narrowband reference signal;
   means for receiving an indication of a manner in which the signal is to be combined with the narrowband reference signal to determine the combined signal quality parameter, wherein the indication indicates a power level of the signal relative to the narrowband reference signal, and wherein the narrowband reference signal includes multiple narrowband reference signals; and
   means for determining, in the indicated manner, the combined signal quality parameter using a linear average based at least in part on the signal, as adjusted based on the power level, and the multiple narrowband reference signals.

31. A non-transitory computer-readable medium storing one or more instructions for wireless communication, the one or more instructions comprising:
   one or more instructions that, when executed by one or more processors, cause the one or more processors to:
      receive a signal to be combined with a narrowband reference signal to determine a combined signal quality parameter, wherein the signal is not a narrowband reference signal;
      receive an indication of a manner in which the signal is to be combined with the narrowband reference signal to determine the combined signal quality parameter, wherein the indication indicates a power level of the signal relative to the narrowband reference signal, and wherein the narrowband reference signal includes multiple narrowband reference signals; and
      determine, in the indicated manner, the combined signal quality parameter using a linear average based at least in part on the signal, as adjusted based on the power level, and the multiple narrowband reference signals.

* * * * *